United States Patent
Anderson et al.

(10) Patent No.: US 12,017,246 B2
(45) Date of Patent: Jun. 25, 2024

(54) TIRE DRESSING MACHINE AND APPLICATION METHOD

(71) Applicant: Howco, Inc., Charlotte, NC (US)

(72) Inventors: Peter J. Anderson, Raleigh, NC (US); Charles Andrew Howard, Charlotte, NC (US)

(73) Assignee: Howco, Inc., Charlotte, NC (US)

( * ) Notice: Subject to any disclaimer, the term of this patent is extended or adjusted under 35 U.S.C. 154(b) by 0 days.

(21) Appl. No.: 17/384,156

(22) Filed: Jul. 23, 2021

(65) Prior Publication Data

US 2021/0346907 A1     Nov. 11, 2021

Related U.S. Application Data

(62) Division of application No. 15/973,942, filed on May 8, 2018, now Pat. No. 11,097,302.

(60) Provisional application No. 62/504,314, filed on May 10, 2017.

(51) Int. Cl.
  *B05C 1/02*     (2006.01)
  *B05C 21/00*    (2006.01)
  *B60S 3/04*     (2006.01)

(52) U.S. Cl.
  CPC .............. *B05C 1/02* (2013.01); *B05C 21/00* (2013.01); *B60S 3/042* (2013.01); *B60S 3/04* (2013.01)

(58) Field of Classification Search
  None
  See application file for complete search history.

(56) References Cited

U.S. PATENT DOCUMENTS

| | | | | |
|---|---|---|---|---|
| 1,487,062 A * | 3/1924 | Hohl | .......................... | B60S 3/04 15/345 |
| 1,682,902 A * | 9/1928 | Gibson | ..................... | B60S 3/04 451/75 |
| 1,909,869 A * | 5/1933 | Randrup | .................. | B60S 3/042 15/53.4 |
| 2,025,780 A * | 12/1935 | Rosebrook | .............. | B60S 3/042 15/53.3 |
| 2,490,921 A * | 12/1949 | Rousseau | ................ | B60S 3/042 15/53.4 |
| 2,579,866 A * | 12/1951 | Rousseau | .................. | B60S 3/06 451/130 |
| 2,692,214 A | 10/1954 | Hurst | | |
| 2,807,271 A * | 9/1957 | Spinner, Jr. | ............. | B60S 3/042 134/156 |
| 2,910,202 A * | 10/1959 | Clarke | .................... | B60S 3/042 15/88.1 |
| 2,975,446 A * | 3/1961 | Furman | ................... | B60S 3/042 15/53.4 |
| 2,978,718 A * | 4/1961 | Vani | ........................ | B60S 3/042 15/53.4 |

(Continued)

OTHER PUBLICATIONS

International Search Report and Written Opinion of corresponding application PCT/US18/31795, dated Sep. 25, 2018.

*Primary Examiner* — Jethro M. Pence
(74) *Attorney, Agent, or Firm* — Nelson Mullins Riley & Scarborough LLP

(57) ABSTRACT

A vehicle tire dressing machine comprises a longitudinal linear guide system and a lateral linear guide system. The longitudinal linear guide system is adjacent and parallel to a transport conveyor for a vehicle having a vehicle tire, and the longitudinal linear guide system has a drive motor and is adapted for reciprocal motion thereon.

8 Claims, 22 Drawing Sheets

(56) References Cited

U.S. PATENT DOCUMENTS

| | | | | |
|---|---|---|---|---|
| 3,037,223 | A * | 6/1962 | Lovsey | B60S 3/042 15/53.3 |
| 3,191,207 | A * | 6/1965 | Van Brakel | B60S 3/042 15/53.4 |
| 3,208,089 | A * | 9/1965 | Vani | B60S 3/042 15/53.4 |
| 3,259,138 | A * | 7/1966 | Heinicke | B60S 3/04 118/316 |
| 3,305,886 | A * | 2/1967 | Fricke | B60S 3/042 15/53.4 |
| 3,312,991 | A * | 4/1967 | Matson | B60S 3/042 15/53.4 |
| 3,337,896 | A * | 8/1967 | Allen | B60S 3/04 134/123 |
| 3,346,895 | A * | 10/1967 | Consolo | B60S 3/042 15/53.2 |
| 3,349,783 | A * | 10/1967 | Ellis | B60S 3/04 134/45 |
| 3,425,080 | A * | 2/1969 | Dolitzsch | B60S 3/063 15/53.2 |
| 3,425,427 | A * | 2/1969 | Andersen | B60S 3/042 134/32 |
| 3,541,627 | A * | 11/1970 | Grant | B60S 3/042 15/53.4 |
| 3,559,659 | A * | 2/1971 | Gougoulas | B60S 3/04 134/45 |
| 3,561,031 | A * | 2/1971 | Gusse et al. | B60S 3/042 15/53.4 |
| 3,570,502 | A * | 3/1971 | Farnsworth | B60S 3/04 134/123 |
| 3,605,156 | A * | 9/1971 | George | B60S 3/042 29/81.02 |
| 3,628,212 | A * | 12/1971 | Van Brakel | B60S 3/042 15/53.4 |
| 3,643,275 | A * | 2/1972 | Van Brakel | B60S 3/042 15/53.4 |
| 3,667,486 | A * | 6/1972 | Cole | B60S 3/042 134/45 |
| 3,681,805 | A * | 8/1972 | Shelstad | B60S 3/004 15/53.4 |
| 3,706,317 | A * | 12/1972 | Fox | B60S 3/04 134/72 |
| 3,809,919 | A * | 5/1974 | Aaron | B60S 3/04 307/41 |
| 3,814,053 | A * | 6/1974 | Andersen | B60S 3/04 118/668 |
| 3,903,559 | A * | 9/1975 | Kuster | B60S 3/042 15/53.4 |
| 3,914,816 | A * | 10/1975 | Tantlinger | B60S 3/042 15/103 |
| 4,192,037 | A * | 3/1980 | Capra | B60S 3/042 15/53.4 |
| 4,293,914 | A * | 10/1981 | Van Trang | G05B 19/07 340/673 |
| 4,493,382 | A * | 1/1985 | Collins | E21B 21/01 175/207 |
| 4,550,464 | A | 11/1985 | Messing | |
| 4,643,209 | A * | 2/1987 | Fast | B60S 3/042 134/123 |
| 4,651,925 | A * | 3/1987 | Harris | B08B 3/02 91/344 |
| 4,694,523 | A * | 9/1987 | Van Brakel | B60S 3/042 15/53.4 |
| 4,718,439 | A * | 1/1988 | Gorra | B60S 3/04 401/289 |
| 4,719,932 | A * | 1/1988 | Burton | B60S 3/04 134/123 |
| 4,726,388 | A * | 2/1988 | Swinehart | B60S 3/04 134/123 |
| 4,786,223 | A * | 11/1988 | Crissy | B60P 3/075 410/20 |
| 4,800,944 | A * | 1/1989 | Kane | B60C 25/138 157/1.22 |
| 4,893,229 | A * | 1/1990 | Detrick | B60S 3/002 134/123 |
| 4,916,771 | A * | 4/1990 | Weigele | B60S 3/042 15/53.4 |
| 4,946,513 | A * | 8/1990 | Del Prato | B60S 3/04 134/123 |
| 4,967,442 | A * | 11/1990 | Weigele | B60S 3/04 15/97.1 |
| 4,971,084 | A * | 11/1990 | Smith | B60S 3/042 239/560 |
| 4,972,862 | A * | 11/1990 | Belanger | B60S 3/042 134/123 |
| 4,981,523 | A * | 1/1991 | Larson | B60S 3/04 134/45 |
| 4,987,962 | A * | 1/1991 | Purguette | B60K 25/08 180/53.6 |
| 4,988,042 | A * | 1/1991 | Del Prato | B60S 3/04 239/548 |
| 5,052,629 | A * | 10/1991 | Belanger | B60S 3/042 15/53.4 |
| 5,076,202 | A * | 12/1991 | Falls | B05C 1/02 118/244 |
| 5,090,429 | A * | 2/1992 | Barber | B60S 3/04 134/123 |
| RE33,849 | E * | 3/1992 | Detrick | B60S 3/002 134/123 |
| 5,123,136 | A * | 6/1992 | Belanger | B60S 3/042 15/53.4 |
| 5,125,981 | A * | 6/1992 | Belanger | B60S 3/042 134/32 |
| 5,180,141 | A * | 1/1993 | Hunt | B66F 15/00 29/273 |
| 5,309,931 | A | 5/1994 | Meyer | |
| 5,320,121 | A | 6/1994 | Alexanian | |
| 5,413,128 | A * | 5/1995 | Butts | B60S 3/04 134/123 |
| 5,447,574 | A * | 9/1995 | Inoue | B08B 3/024 134/123 |
| 5,463,788 | A * | 11/1995 | Ennis | B60S 3/04 15/53.2 |
| 5,687,978 | A * | 11/1997 | Rhodes | B62B 1/208 280/30 |
| 5,803,098 | A * | 9/1998 | Decker | B60S 3/04 134/123 |
| 5,806,542 | A * | 9/1998 | Hoffer | B60S 3/04 134/123 |
| 5,853,127 | A * | 12/1998 | Heembrock | B08B 3/02 239/587.5 |
| 6,055,994 | A * | 5/2000 | Decker | B60S 3/04 134/123 |
| 6,082,634 | A * | 7/2000 | MacNeil | B05B 3/02 134/123 |
| 6,088,864 | A * | 7/2000 | Smith, II | B60S 3/06 134/123 |
| 6,260,225 | B1 * | 7/2001 | Bowman | B29D 30/0061 118/304 |
| 6,358,330 | B1 * | 3/2002 | McGraw | B60S 3/042 134/123 |
| 6,372,053 | B1 * | 4/2002 | Belanger | B60S 3/04 134/123 |
| 6,383,295 | B1 * | 5/2002 | Frederick, Jr. | B60S 3/042 134/123 |
| 6,461,429 | B1 * | 10/2002 | Gorra | B60S 3/004 15/53.4 |
| 6,461,685 | B2 * | 10/2002 | Gorra | B60S 3/042 134/123 |
| 6,502,765 | B1 * | 1/2003 | Chase | B60S 3/04 239/751 |
| 6,568,411 | B1 * | 5/2003 | Staples | B60S 3/04 134/123 |
| 6,718,216 | B2 * | 4/2004 | Grier | B60S 3/04 134/56 R |
| 6,726,779 | B2 * | 4/2004 | Klos | B60S 3/04 134/36 |

(56) References Cited

U.S. PATENT DOCUMENTS

| | | | | |
|---|---|---|---|---|
| 6,936,104 | B2* | 8/2005 | Gorra | B60S 3/004 15/53.4 |
| 6,968,588 | B2* | 11/2005 | Nemcek | A63B 55/60 15/53.4 |
| 7,100,621 | B2* | 9/2006 | Johnson | B60S 3/04 134/123 |
| 7,318,442 | B2* | 1/2008 | MacDowell | B60S 3/004 134/201 |
| 7,337,791 | B1* | 3/2008 | Belanger | B60S 3/04 134/123 |
| 7,346,956 | B2* | 3/2008 | Andre | B08B 1/02 15/381 |
| RE40,463 | E* | 8/2008 | Belanger | B60S 3/06 134/123 |
| 7,559,333 | B2* | 7/2009 | Belanger | B05B 13/0278 134/123 |
| 7,582,164 | B1 | 9/2009 | Krause et al. | |
| 7,585,367 | B1* | 9/2009 | Tognetti | B60S 3/042 118/221 |
| 7,617,832 | B2* | 11/2009 | MacDowell | B60S 3/04 134/201 |
| 7,775,221 | B2* | 8/2010 | Zeile | B60S 3/04 134/123 |
| 7,806,128 | B2* | 10/2010 | Kim Brillouet | B08B 3/00 134/179 |
| 7,971,594 | B2* | 7/2011 | Belanger | B60S 3/042 134/123 |
| 8,383,207 | B2* | 2/2013 | Falbaum | B60S 3/042 118/316 |
| 8,424,480 | B2* | 4/2013 | Wentworth | B60S 3/042 15/DIG. 3 |
| 8,453,657 | B2* | 6/2013 | Belanger | B60S 3/04 134/123 |
| 8,578,542 | B2* | 11/2013 | Edwards, III | B60S 3/04 37/196 |
| 8,769,756 | B2* | 7/2014 | Wentworth | B60S 3/042 15/53.4 |
| 8,789,545 | B2* | 7/2014 | Ennis | B60S 3/042 134/123 |
| 8,813,765 | B2* | 8/2014 | Petit | B05B 3/14 239/548 |
| 8,857,451 | B2* | 10/2014 | Opdyke | B60S 3/002 134/123 |
| 9,009,904 | B2* | 4/2015 | Edwards, III | B60S 3/00 15/DIG. 2 |
| 9,162,651 | B2* | 10/2015 | MacNeil | B60S 3/04 |
| 9,162,652 | B2* | 10/2015 | Belanger | B60S 3/04 |
| 9,283,933 | B2* | 3/2016 | MacNeil | A46B 13/02 |
| 9,290,161 | B2* | 3/2016 | Belanger | B60S 3/042 |
| 9,533,315 | B2* | 1/2017 | Petit | B08B 3/024 |
| 9,630,594 | B2* | 4/2017 | Irwin | B60S 3/06 |
| 9,676,373 | B1* | 6/2017 | Bond | B60S 3/04 |
| 9,849,473 | B2* | 12/2017 | Petit | B08B 3/024 |
| 9,862,359 | B2* | 1/2018 | Belanger | B60S 3/004 |
| 9,969,364 | B2* | 5/2018 | Oliver | B60S 3/04 |
| 10,207,411 | B2* | 2/2019 | Michalakis | H04N 5/332 |
| 10,266,156 | B2* | 4/2019 | Belanger | B60S 3/06 |
| 10,279,782 | B2* | 5/2019 | Hirata | B60S 3/042 |
| 10,286,410 | B2* | 5/2019 | Petit | B60S 3/04 |
| 10,286,882 | B2* | 5/2019 | Mathissen | B01D 46/0002 |
| 10,335,835 | B2* | 7/2019 | Peinelt | B60B 1/00 |
| 10,391,982 | B2* | 8/2019 | Belanger | B65G 19/02 |
| 10,682,989 | B2* | 6/2020 | Blackstock | G05D 7/0623 |
| 10,696,278 | B2* | 6/2020 | Belanger | G06Q 30/0641 |
| 10,723,327 | B2* | 7/2020 | Belanger | A46B 13/04 |
| 10,752,220 | B2* | 8/2020 | Belanger | B29C 41/04 |
| 10,968,602 | B2* | 4/2021 | Hendricks | E02F 9/2054 |
| 10,974,263 | B2* | 4/2021 | Petit | B08B 3/024 |
| 10,994,706 | B2* | 5/2021 | Detrick | F15B 15/2876 |
| 11,007,983 | B2* | 5/2021 | Belanger | B60S 3/04 |
| 11,061,409 | B2* | 7/2021 | Hendricks | B60P 1/04 |
| 11,097,302 | B2 | 8/2021 | Anderson et al. | |
| 11,110,900 | B2* | 9/2021 | Stephenson | B62D 15/028 |
| 11,127,283 | B2* | 9/2021 | Ness | G06T 7/292 |
| 11,173,880 | B2* | 11/2021 | Dietsch | B08B 1/002 |
| 11,203,328 | B2* | 12/2021 | Wilson | B60S 3/002 |
| 11,241,721 | B2* | 2/2022 | Violetta | B60S 1/56 |
| 11,370,397 | B2* | 6/2022 | Lingeskog | B60S 3/042 |
| 11,443,260 | B1* | 9/2022 | van Breen | G06Q 50/12 |
| 11,458,878 | B2* | 10/2022 | Hendricks | E02F 9/262 |
| 11,498,785 | B2* | 11/2022 | Hendricks | B65G 67/24 |
| 2001/0037765 | A1* | 11/2001 | Gorra | B60S 3/042 118/264 |
| 2002/0112745 | A1* | 8/2002 | Belanger | B60S 3/04 134/123 |
| 2002/0112748 | A1* | 8/2002 | Niland | B08B 3/02 134/123 |
| 2002/0179125 | A1* | 12/2002 | Klos | B60S 3/04 134/123 |
| 2003/0233153 | A1* | 12/2003 | Grier | B60S 3/04 700/11 |
| 2004/0155126 | A1* | 8/2004 | Jenkins | B60P 1/43 241/24.11 |
| 2004/0200511 | A1* | 10/2004 | Klos | C11D 11/0041 134/36 |
| 2004/0221878 | A1* | 11/2004 | Johnson | B60S 3/04 134/123 |
| 2005/0102777 | A1* | 5/2005 | Johansson | B60S 3/04 134/123 |
| 2005/0229808 | A1* | 10/2005 | MacDowell | B60S 3/004 105/157.1 |
| 2005/0279385 | A1* | 12/2005 | Grier | B60S 3/04 134/123 |
| 2005/0287303 | A1* | 12/2005 | Gorra | C08J 7/0427 106/287.1 |
| 2006/0107486 | A1* | 5/2006 | Andre | B08B 1/02 15/345 |
| 2006/0157093 | A1* | 7/2006 | Belanger | B60S 3/04 134/123 |
| 2006/0157094 | A1* | 7/2006 | Zeile | B60S 3/042 134/123 |
| 2007/0068554 | A1* | 3/2007 | Essenburg | B60S 3/042 134/123 |
| 2007/0084650 | A1* | 4/2007 | Schwei | B08B 3/02 422/1 |
| 2007/0169796 | A1* | 7/2007 | Johnson | B08B 3/026 134/123 |
| 2007/0175498 | A1* | 8/2007 | Smith | B60S 3/042 134/123 |
| 2007/0177931 | A1* | 8/2007 | Hodges | B60S 3/042 401/289 |
| 2007/0227558 | A1* | 10/2007 | Chase | B60S 3/04 134/123 |
| 2007/0277858 | A1* | 12/2007 | Soria | B60S 3/04 134/63 |
| 2008/0000508 | A1* | 1/2008 | Lee | B60S 3/042 134/123 |
| 2008/0028974 | A1* | 2/2008 | Bianco | B60S 3/04 104/165 |
| 2008/0047593 | A1* | 2/2008 | Belanger | B60S 3/04 134/123 |
| 2008/0187674 | A1* | 8/2008 | Wentworth | B60S 3/042 427/429 |
| 2008/0308133 | A1* | 12/2008 | Grubb | B60S 3/004 134/72 |
| 2009/0133728 | A1* | 5/2009 | Kim Brillouet | B08B 3/00 134/57 R |
| 2009/0194020 | A1* | 8/2009 | Ennis | B60S 3/042 118/256 |
| 2009/0217944 | A1* | 9/2009 | Munera | B08B 3/022 134/32 |
| 2009/0308417 | A1* | 12/2009 | Belanger | B60S 3/04 134/123 |
| 2010/0059089 | A1* | 3/2010 | Opdyke | B60S 3/002 134/37 |
| 2010/0192991 | A1* | 8/2010 | Belanger | B60S 3/04 340/815.45 |
| 2010/0206341 | A1* | 8/2010 | Essenburg | B60S 3/04 134/45 |

(56) References Cited

U.S. PATENT DOCUMENTS

| | | | |
|---|---|---|---|
| 2010/0272916 A1* | 10/2010 | Falbaum | B60S 3/04 427/427.2 |
| 2010/0326467 A1* | 12/2010 | Belanger | B60S 3/042 134/45 |
| 2011/0197935 A1* | 8/2011 | Belanger | B60S 3/04 134/123 |
| 2011/0284030 A1* | 11/2011 | MacNeil | B60S 3/04 134/123 |
| 2012/0125379 A1* | 5/2012 | Ennis | B60S 3/042 134/123 |
| 2012/0198636 A1* | 8/2012 | Edwards, III | B60S 3/04 15/93.1 |
| 2012/0240959 A1* | 9/2012 | Harter | F16P 7/00 134/18 |
| 2013/0081569 A1* | 4/2013 | Wentworth | B60S 3/042 118/313 |
| 2013/0291906 A1* | 11/2013 | Belanger | B60S 3/042 134/123 |
| 2013/0291909 A1* | 11/2013 | Belanger | B60S 3/04 134/123 |
| 2014/0059788 A1* | 3/2014 | Edwards, III | B60S 3/00 15/93.1 |
| 2014/0076366 A1* | 3/2014 | Belanger | B60S 3/04 134/34 |
| 2014/0102489 A1* | 4/2014 | Smith | B60S 3/042 134/123 |
| 2014/0238439 A1* | 8/2014 | Irwin | B60S 3/06 134/6 |
| 2014/0339335 A1* | 11/2014 | Petit | B08B 3/024 239/548 |
| 2015/0273515 A1* | 10/2015 | Diskin | B05B 7/12 118/206 |
| 2015/0273531 A1* | 10/2015 | Oliver | B60S 3/04 134/123 |
| 2015/0274137 A1* | 10/2015 | Belanger | A46B 13/008 15/53.1 |
| 2016/0264104 A1* | 9/2016 | Belanger | B60S 3/002 |
| 2016/0264105 A1* | 9/2016 | Belanger | A46B 13/001 |
| 2016/0311409 A1* | 10/2016 | Schutz | B60S 3/04 |
| 2017/0361812 A1* | 12/2017 | McCormick | B08B 3/02 |
| 2019/0047523 A1* | 2/2019 | Lee | E04H 6/22 |
| 2019/0256056 A1* | 8/2019 | Kim | G06T 17/00 |
| 2019/0256057 A1* | 8/2019 | Kim | G05B 19/0428 |
| 2019/0283717 A1* | 9/2019 | Kim | G06T 17/00 |
| 2021/0016749 A1* | 1/2021 | Lee | B60S 3/042 |
| 2021/0109530 A1* | 4/2021 | Inoue | B60S 3/042 |
| 2021/0146889 A1* | 5/2021 | Kuehne | B60S 3/04 |
| 2021/0170996 A1* | 6/2021 | Christ | H02K 5/04 |
| 2022/0055575 A1* | 2/2022 | Chu | B60S 3/04 |
| 2022/0055576 A1* | 2/2022 | Chu | B08B 3/022 |
| 2022/0055577 A1* | 2/2022 | Chu | B08B 3/024 |
| 2022/0092996 A1* | 3/2022 | Korngold | G06V 20/56 |
| 2022/0105906 A1* | 4/2022 | Detrick | F15B 15/2876 |
| 2022/0176918 A1* | 6/2022 | Peters | B60S 13/02 |
| 2022/0178964 A1* | 6/2022 | Martin | G01P 5/14 |
| 2022/0234549 A1* | 7/2022 | Schütz | B60S 3/008 |

* cited by examiner

TIRE DRESSING MACHINE AND APPLICATION METHOD

CROSS-REFERENCE TO RELATED APPLICATION

This application is a divisional application of U.S. patent application Ser. No. 15/973,942, filed on May 8, 2018, which application claims priority from U.S. provisional patent application No. 62/504,314, filed on May 10, 2017, in the United States Patent and Trademark Office. The disclosures of which are incorporated herein by reference in their entireties.

FIELD OF THE INVENTION

The present invention relates to an automated vehicle tire dressing machine and application method, more particularly, to a machine and a method for applying a tire dressing to an exterior tire wall(s) of a vehicle tire as a vehicle is driven through a carwash bay or tunnel.

BACKGROUND OF THE INVENTION

Tire dressing is typically a chemical product applied to a surface of a vehicle tire to provide an attractive shine and protective coating. A tire dressing machine typically operates by spraying a liquid tire dressing onto the tire with a pressurized mist or by a saturated media contact transfer as the vehicle passes by the machine.

The media contact transfer method is the most common of the methods utilized in the professional car detailing industry. A chemical pump or a reservoir dispenses the tire dressing chemical onto an open-cell roller, a bristle brush, or a pad type transfer media. The transfer media may be rotationally powered or even static. The misting spray method generally uses a bar of some type in fluid communication with a chemical pressure pump and that simply sprays the tire as its passes by the apparatus.

Both approaches have distinct disadvantages. The spray type does not apply the dressing in a very accurate or controlled manner. The tire dressing chemical mist therefore ends up on the wash bay floor as a slippery hazard, or even may get pulled into nearby vehicle drying blowers and then be redeposited on the paint surfaces generally as an undesirable oily type film on the vehicle. Therefore, manufacturers have endeavored to avoid this problem by using the aforementioned media contact transfer method. Of the various designs, the most common is a long cylinder shaped applicator that either spins with applicator brushes or slowly rotates with foam rollers as the tires push into the rollers. The spinning brushes cause unwanted misting and disposition onto the car and floor, and the foam rollers become damaged due to the friction and irregular features on many tires. Both designs cannot distinguish between low profile tires, small tires or large tires, and end up applying much of the tire dressing chemical to the tire rims as well or may not apply adequate dressing to a large profile tire. This is wasteful, causes running or "sling" and may require some manual cleanup or touchup. Additionally, these transfer application rollers are generally mounted close to the floor and require the tire to take a full revolution to transfer dressing to the circumference of the tire wall. This means that to properly apply dressing on a 35 inch diameter tire could require 109 inches of linear space, not including additional angular swing in distance from retract position to vehicle tire contact.

The tire dressing machine and application method of the present invention is designed to overcome these disadvantages.

SUMMARY OF THE INVENTION

The present invention generally relates to a tire dressing machine and application method.

In an embodiment of the invention, a vehicle tire dressing machine comprises a longitudinal linear guide system and a lateral linear guide system. The longitudinal linear guide system is adjacent and parallel to a transport conveyor for a vehicle having a vehicle tire. The longitudinal linear guide system has a drive motor and is adapted for reciprocal motion thereon. The longitudinal linear guide system is operably connected to a logic controller. The lateral linear guide system is mounted upon and transverse to the longitudinal linear guide system. The lateral linear guide system has a shuttle mounted thereon and is adapted for linear reciprocal motion. The shuttle has a movable arm assembly with a motor mounted thereon. The movable arm assembly is operable to rotate to various positions and to elevate an applicator head about the vehicle tire.

In an embodiment of the invention, a vehicle tire dressing machine comprises a coordinated motion control system having at least one axis of linear motion and at least one axis of angular motion, and an applicator head coordinated with the coordinated motion control system. The applicator head may have counter-rotating brushes and is operable to contour the vehicle tire.

In an embodiment of the invention, a vehicle tire dressing machine comprises a coordinated motion control system with at least one axis of linear motion and at least one axis of angular motion, and an applicator head coordinated with the coordinated motion control system. The applicator head is operable to contour the outer portion of a tire wall and separately contour the tire wall adjacent to the wheel rim.

In an embodiment of the invention, a system comprises a sensor mounted adjacent to a transport conveyor for a vehicle having a vehicle tire. The sensor detects the presence of the vehicle tire and is operably connected to at least one motor. The sensor moves across a chord of the vehicle tire, and a logic controller in communication with the sensor is operable to calculate the diameter of the vehicle tire from the chord length. A metal detecting sensor directed toward the tire is operable to detect the tire rim and send a signal to the logic controller. The logic controller calculates the rim size. A tire dressing applicator head is operable to circumferentially sweep and shine the vehicle tire separately from the tire rim.

In an embodiment of the invention, a system comprises a sensor mounted adjacent to a transport conveyor for a vehicle having a vehicle tire, a logic controller in communication with the sensor, and a vehicle tire dressing machine in communication with the logic controller. The sensor is operably connected to at least one motor and is movable across a chord of the vehicle tire.

The present invention allows for precision tire wall dressing application regardless of tire size, tire profile, or rim profile. Among the advantages of the tire dressing machine of the present invention is that it reduces waste and manual touchup, reduces overspray hazards, and even reduces the amount of space required in a carwash bay or tunnel to carry out automatic dressing application.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, which are not necessarily to scale, wherein.

DESCRIPTION OF THE PREFERRED EMBODIMENTS

The following description of the embodiments of the present invention is merely exemplary in nature and is in no way intended to limit the invention, its application, or uses. The present invention has broad potential application and utility. The following description is provided herein solely by way of example for purposes of providing an enabling disclosure of the invention, but does not limit the scope or substance of the invention.

Figure 1:
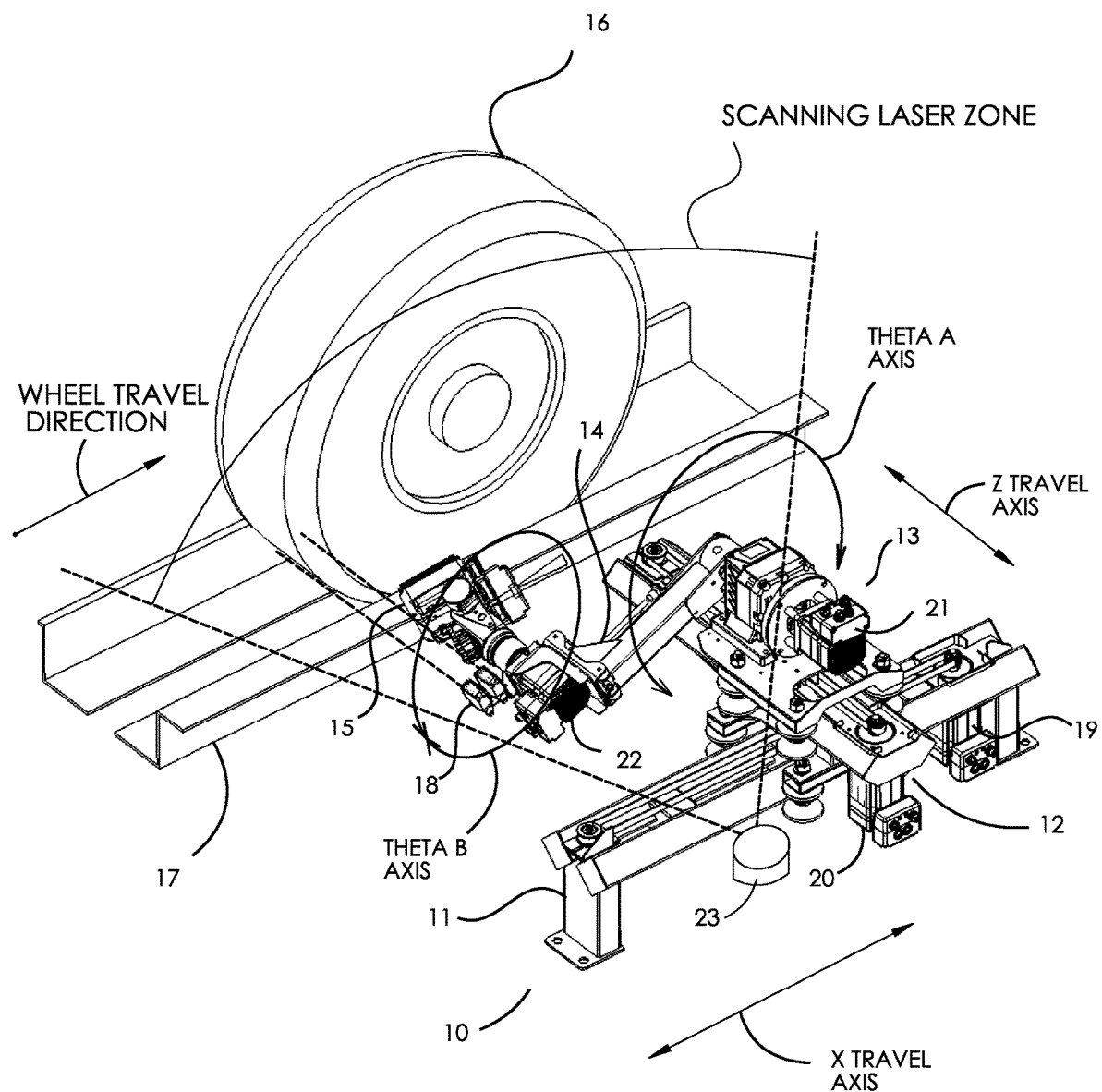
FIG. 1 is an isometric view of a tire dressing machine in accordance with the present invention.

FIG. 1 is an isometric view of a tire dressing machine (also referred to herein as a robot) 10 next to a transport conveyor 17 for use, for example, in a carwash tunnel. A vehicle tire 16 moves on transport conveyor 17 and in front of tire dressing machine 10, preferably moving in a single direction. Vehicle tire 16 has a tire wall 9. Motors 19, 20, 21 and 22, preferably servomotors, are operably connected to and controlled by a logic controller 8 in their respective axis of motion. Motor 19 shifts a lateral (Z-travel axis) frame 12 along longitudinal (X-travel axis) frame 38 having vertical end posts 11 (see FIGS. 1 and 3), so as to follow vehicle tire 16, as vehicle tire 16 travels along transport conveyor 17. Motor 20 expands tire dressing machine 10 towards vehicle tire 16 during a tire dressing application by linearly actuating a shuttle 13, mounted on Z-travel axis frame 12, until an applicator head 15 is in position and then motor 20 retracts shuttle 13 to a home position away from vehicle tire 16 when tire dressing machine 10 is not in use. Motor 21 rotates an arm assembly 14 about a Theta A axis to raise and lower applicator head 15 as needed according to the tire diameter and height. Motor 22 rotates applicator head 15 about a Theta B axis to position applicator head 15 in an optimum orientation for dressing vehicle tire 16. Additionally, at least one laser sensor 18 is coupled to applicator head 15 such that laser sensor 18 detects vehicle tire 16 and/or any gap around vehicle tire 16 (such as between a vehicle fender well and vehicle tire 16) as well as detects the need for logic controller 8 to adjust the position of tire dressing machine 10 accordingly. Alternatively or in conjunction, a rotational laser scanning sensor 23 sweeps the profile of vehicle tire 16 continuously as vehicle tire 16 travels down transport conveyor 17. Rotational laser scanning sensor 23 measures the size of vehicle tire 16 by scanning along a tire chord of vehicle tire 16 so logic controller 8 can calculate the diameter of vehicle tire 16. Rotational laser scanning sensor 23 also tracks the progress of vehicle tire 16 in transport conveyor 17. It should be noted that logic controller 8 is programmed such that it can maintain a linear-circular relationship between the X-axis, Theta A axis, and Theta B axis to maintain coordinated motion in a coordinated motion control system causing applicator head 15 to follow the contour of the tire wall 9 during the tire dressing application.

Figure 2A:
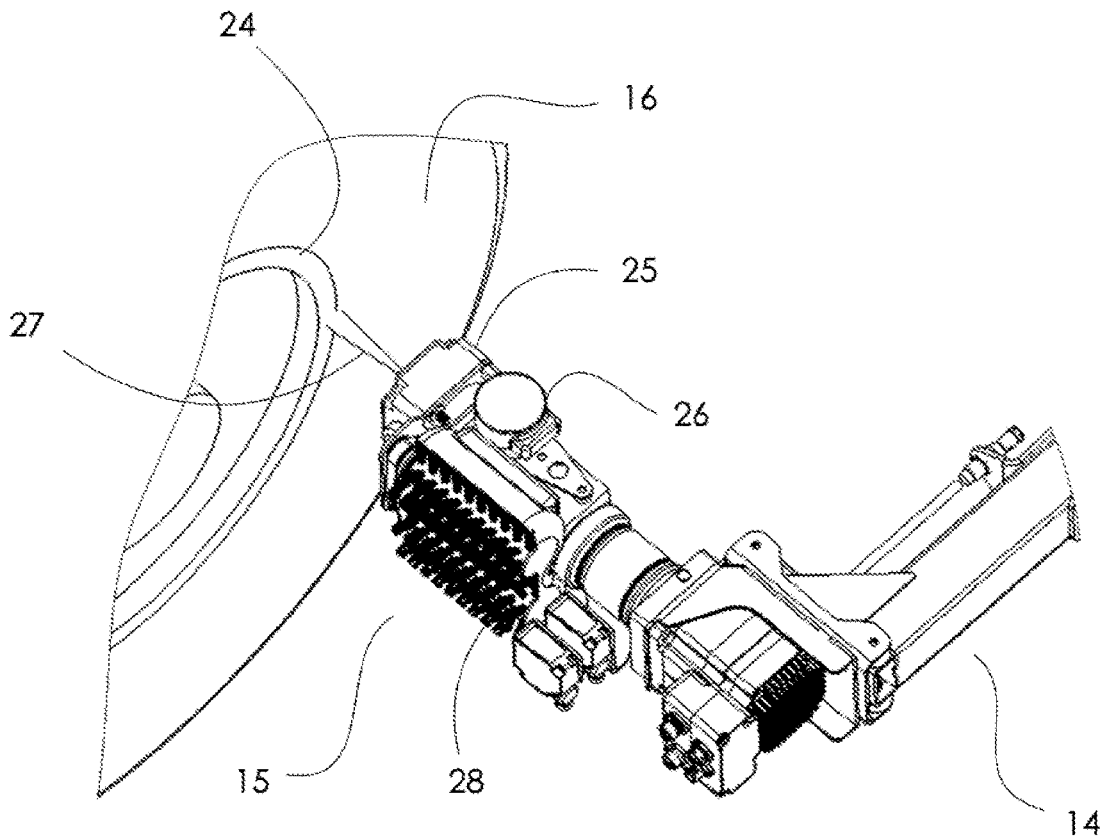
FIG. 2A is a partial isometric view illustrating the applicator head of FIG. 1 in a home position.
Figure 2B:
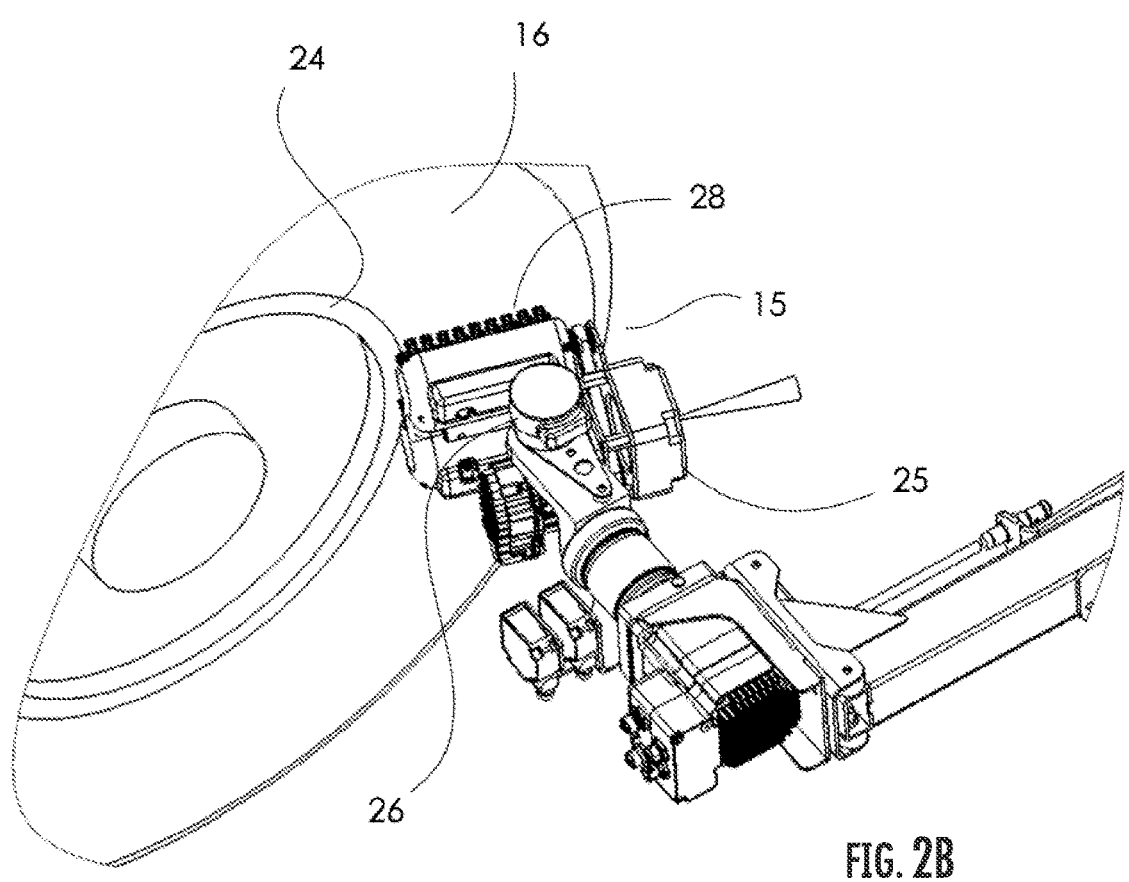
FIG. 2B is a partial isometric view illustrating the applicator head of FIG. 1 in another position.

FIGS. 2A and 2B are partial isometric views showing applicator head 15 in two different positions by actuating a pneumatic rotary actuator 26. FIG. 2A shows applicator head 15 in a home position which orients a high powered inductive proximity switch 25 toward vehicle tire 16. As part of the initial tire measurement laser scanning, tire dressing machine 10 sweeps proximity switch 25 across the tire profile and proximity switch 25 detects a metal tire rim 24 by an inductive electromagnetic field 27. Inductive proximity switch 25 sends a signal to logic controller 8, and logic controller 8 records the rim size in relationship to the vehicle tire. Tire dressing machine 10 then positions applicator head 15 next to metal tire rim 24 as shown in FIG. 2B and sweeps applicator head 15 around metal tire rim 24 and along the tire wall inner section.

Figure 3:
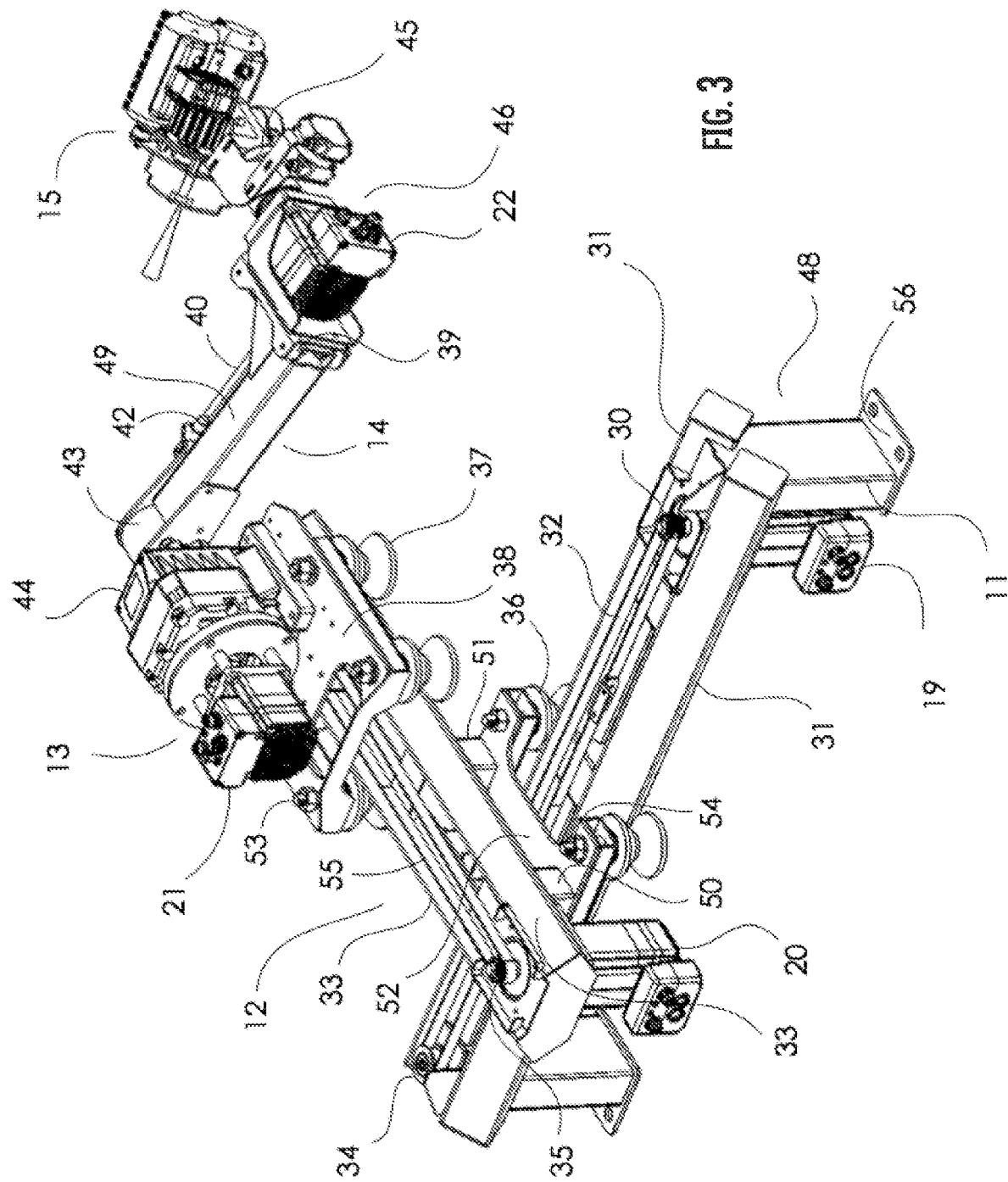
FIG. 3 is an enlarged isometric view of the tire dressing machine of FIG. 1.

FIG. 3 is an enlarged isometric view of tire dressing machine 10. A longitudinal (X-travel axis) frame 48 has two elongated square tubings 31 that serve as structural and guide elements for tire dressing machine 10 and are supported at distal ends by two vertical end posts 11 that elevate the track and provide clearance for motor 19. End posts 11 have flange plates 56 welded onto the bottom of end posts 11 to anchor tire dressing machine 10 to a floor. Lateral (Z-travel axis) frame 12 is mounted transverse and upon longitudinal (X-travel axis) frame 48 by four plastic V-rollers 36 that tightly guide lateral (Z-travel axis) frame 12 on the X-axis frame tubings 31. Lateral (Z-travel axis) frame 12 is reciprocally driven back and forth by motor 19 mounted into longitudinal (X-travel axis) frame 48 at one end, a drive pulley 30 secured onto the motor drive shaft, and a timing belt 32 driven by drive pulley 30 and wrapped around an idler pulley 34 at an opposite end of longitudinal (X-travel axis) frame 48.

Lateral (Z-travel axis) frame 12 is a weldment having two elongated square tubings 33 which are supported and spaced apart by tubing standoffs 50 and 51. Tubing standoffs 50 and 51 are terminated at bottom ends by lateral (Z-travel axis) frame base plate 52, which has holes, preferably four, through which idler axles 54 are bolted, concentrically securing V rollers 36 for rotational movement.

Shuttle assembly 13 has a base plate 38 having a top face with clearance holes therein whereby a suitable gearbox 44 is bolted to the top face. An output shaft of gearbox 44 extends outward toward the vehicle tire and is adapted for mounting arm assembly 14 onto it for rotational actuation of arm assembly 14. Gearbox 44 input is driven by motor 21 which is secured to the input face by a coupler or spline type of connection. Shuttle assembly 13 is actuated for linear reciprocal movement toward and away from vehicle tire 16 by motor 20 mounted to lateral (Z-travel) axis frame 12 at one end and motor having a timing pulley 35 secured onto the end of lateral (Z-travel axis) frame 12 for driving a timing belt 55. At the other end of timing belt 55, an idler pulley is mounted to lateral (Z-travel axis) frame 12 to support the other end of timing belt 55 for rotational movement. A timing belt clamp on the bottom of baseplate 38 locks onto timing belt 55. Additionally, downward extending idler shafts 53, preferably four, are secured into baseplate 38, securing V-rollers 37 so as to locate shuttle assembly 13 to lateral (Z-travel axis) frame 12 for linear reciprocal motion thereupon.

Arm assembly 14 comprises an elongated square tube 49 with flanges at the rotational driving end to house a machined shaft coupling 43 which tightly locks arm assembly 14 onto the end of drive gearbox 44. At the distal end of arm assembly 14, several compliant, elastic isolation mounts 39 allow connection of an arm effector 46 with applicator head 15 at the end without a rigid mechanical connection. This allows for potential vehicle impacts or cycle failures without damaging tire dressing machine 10. Elastic isolation mounts 39 give in all force applied directions and indicator rod 40 along with a proximity sensor 42 separate when this happens and send a signal to logic controller 8, thereby detecting the impact.

Figure 4:
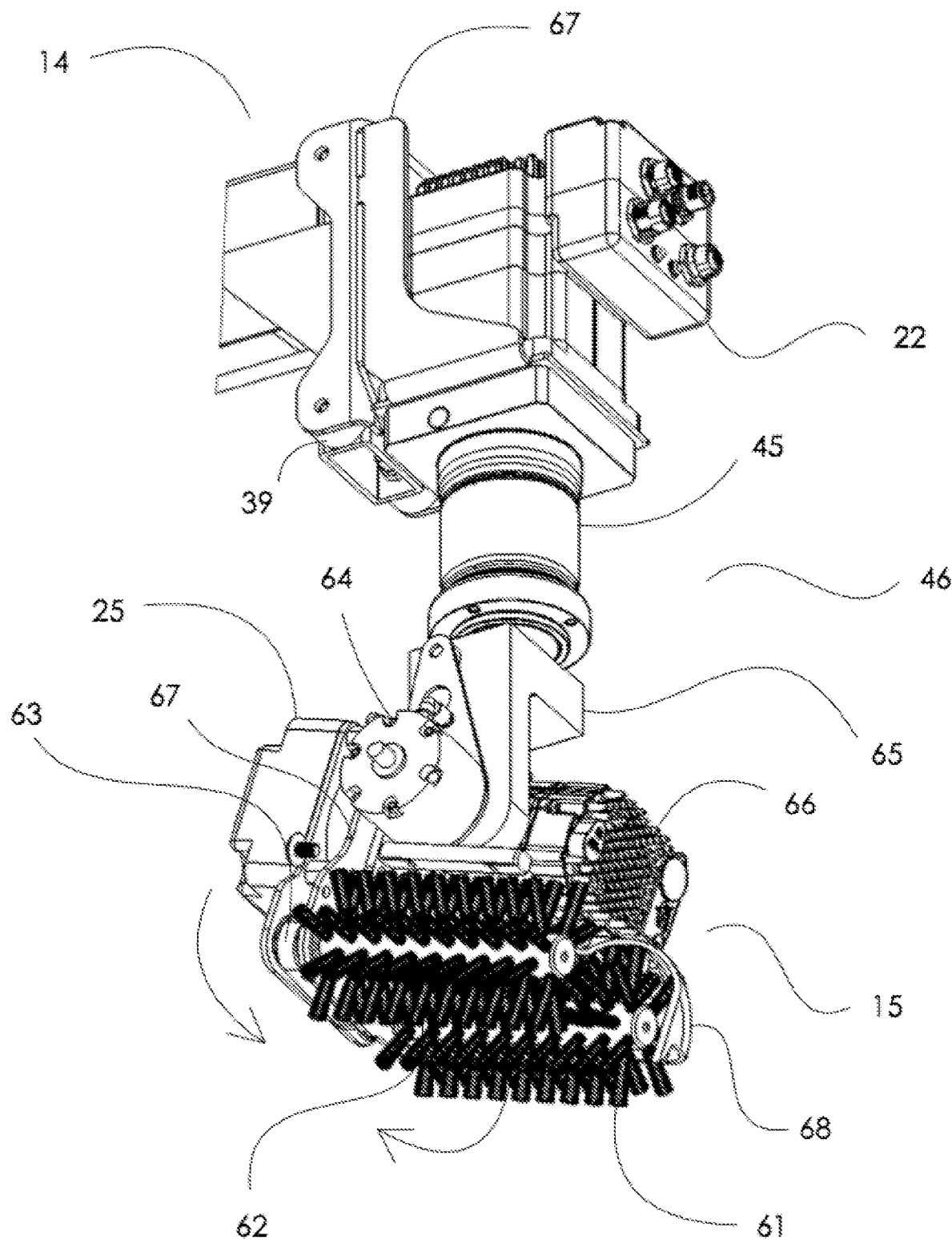
FIG. 4 is a partial enlarged isometric view of an arm effector attached to an arm assembly of the tire dressing machine.

FIG. 4 is a partial enlarged isometric view of arm effector 46 attached to arm assembly 14. A welded base chassis 67 is constructed such that it houses motor 22 and connects to arm assembly 14 by the isolation mounts 39. Additionally, chassis 67 is mounted to the motor by being sandwiched between the motor and a gearbox 45. A strong and lightweight assembly keeps the moment of inertia lower than many other attachment methods.

Applicator head 15 is an assembly controlled in order to rotate about the Theta B axis; however, applicator head 15 is also operable to pivot about Theta C axis as actuated by a pneumatic rotary actuator 64 such that applicator brushes 61 and 62 can be stored away from the vehicle and exposing inductive sensor/proximity switch 25 during wheel rim measurement. Pivot block 65 is clamped into gearbox 45 and retains a set of suitable bearings for the pivotal motion as well. A pivot pin included as part of base chassis 67 allows the rotational connection of applicator head 15 to pivot block 65 and gearbox 45. Base chassis 67 preferably has applicator brushes 61 and 62 mounted to base chassis 67 by a suitable double bearing arrangement and applicator brushes 61 and 62 being driven by motor 66 in a counter-rotating motion. A swabby type of applicator brush may be added on the end of the robot and it may expand outward. A double sided serpentine timing belt 63 is driven by motor 66, and a series of idler pulleys fits timing belt 63 around the brush drive pulleys to provide counter-rotating motion. The advantage of such counter-rotating motion, specifically from outside to inside as the brushes contact the tire, is that the tire wheel dressing has a tendency to sling inward toward the opposing brush rather than outward on one side as would happen with a single brush thereby causing significant undesirable misting of the tire dressing.

In accordance with the present invention, a tire dressing application method is provided. Variations to the method may be made yet still be within the scope of the present invention.

Figure 5:
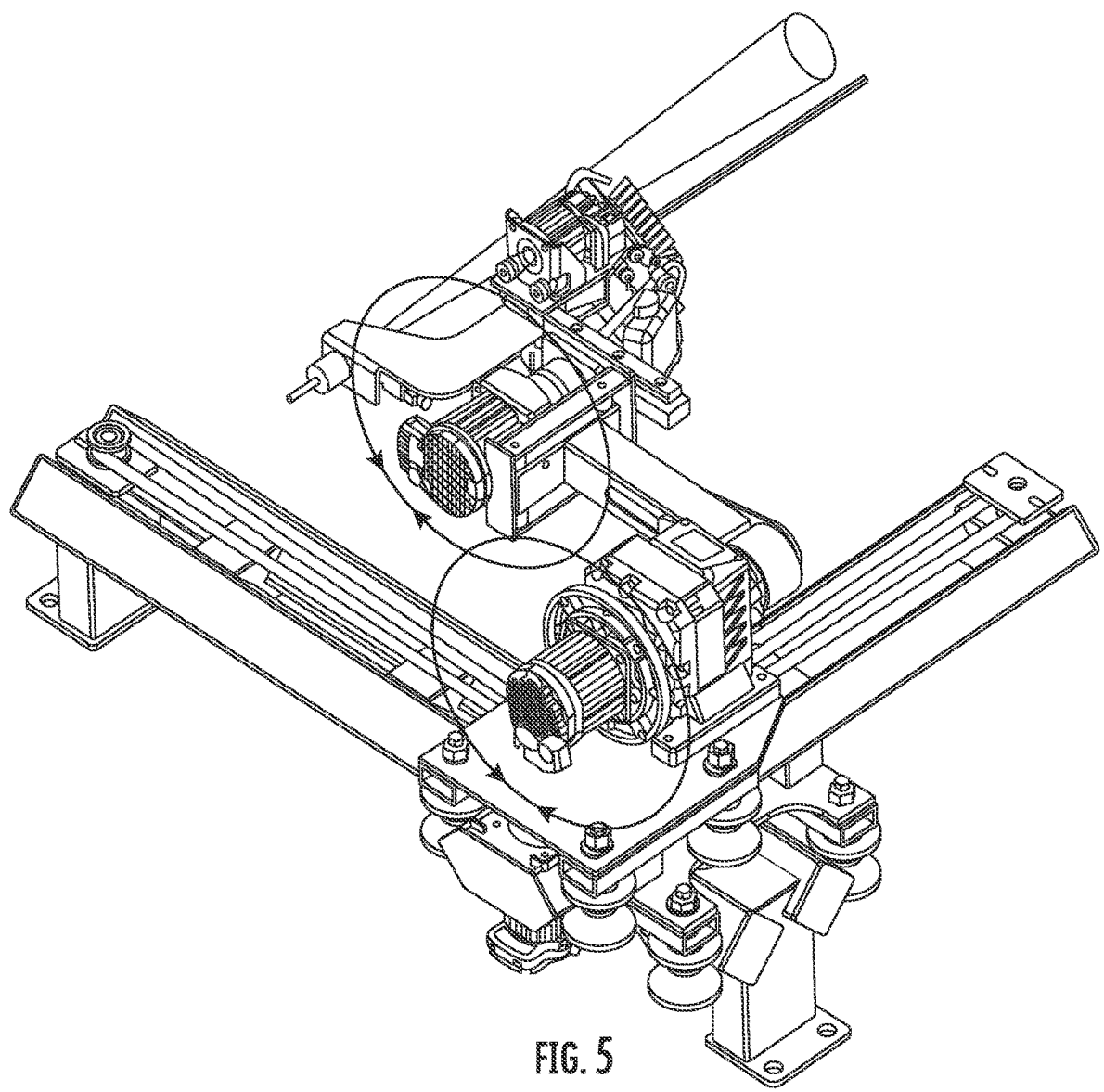
FIG. 5 is an illustration of tire dressing machine (robot) cycling in accordance with the present invention.

FIG. 5 is an illustration of tire dressing machine (robot) cycling in accordance with the present invention.

Figure 6:
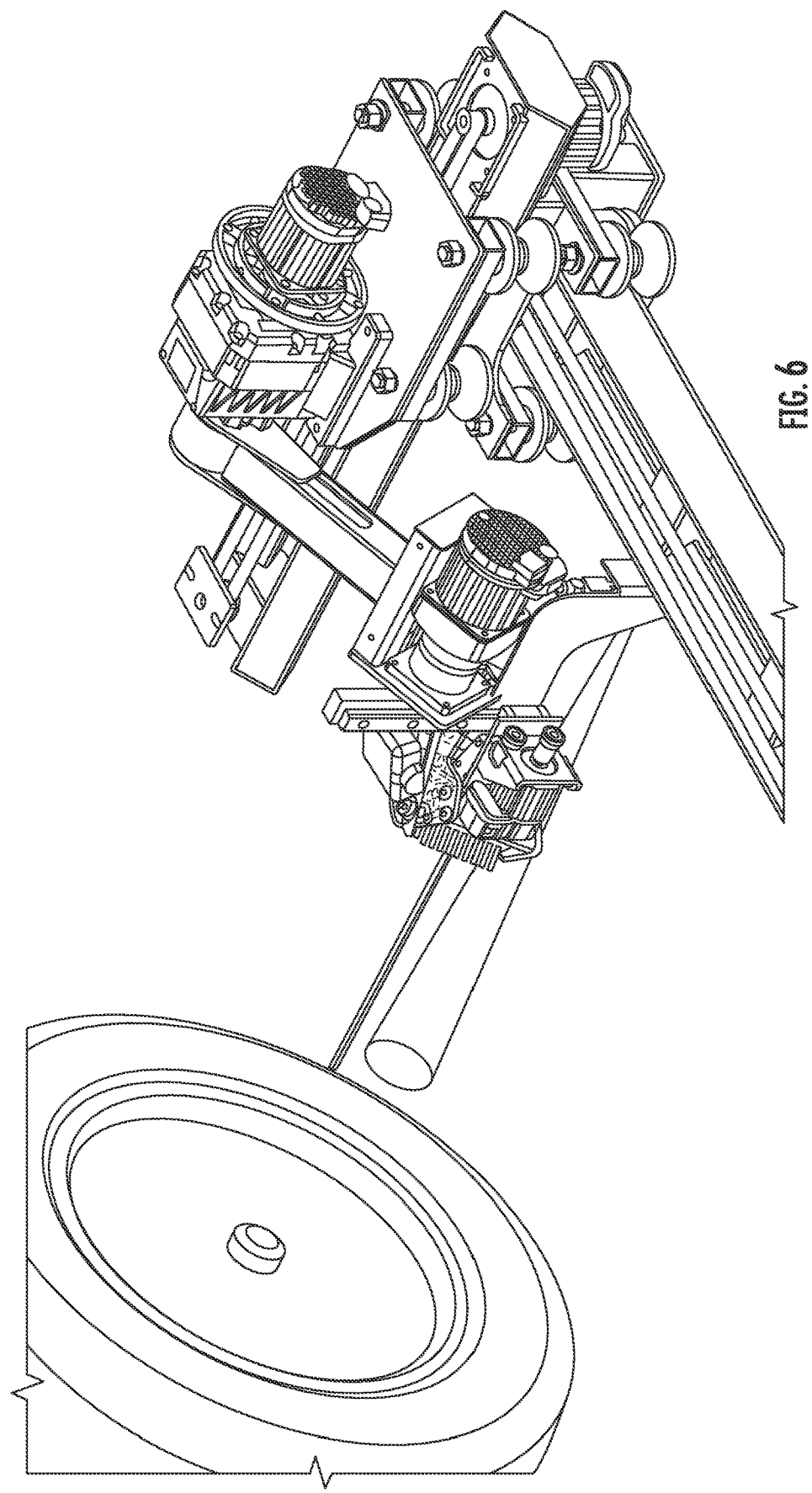
FIG. 6 illustrates the tire dressing machine (robot) receiving a function call from a tunnel controller in accordance with the present invention.

FIG. 6 illustrates the tire dressing machine (robot) receiving a function call from a tunnel controller in accordance with the present invention.

Figure 7:
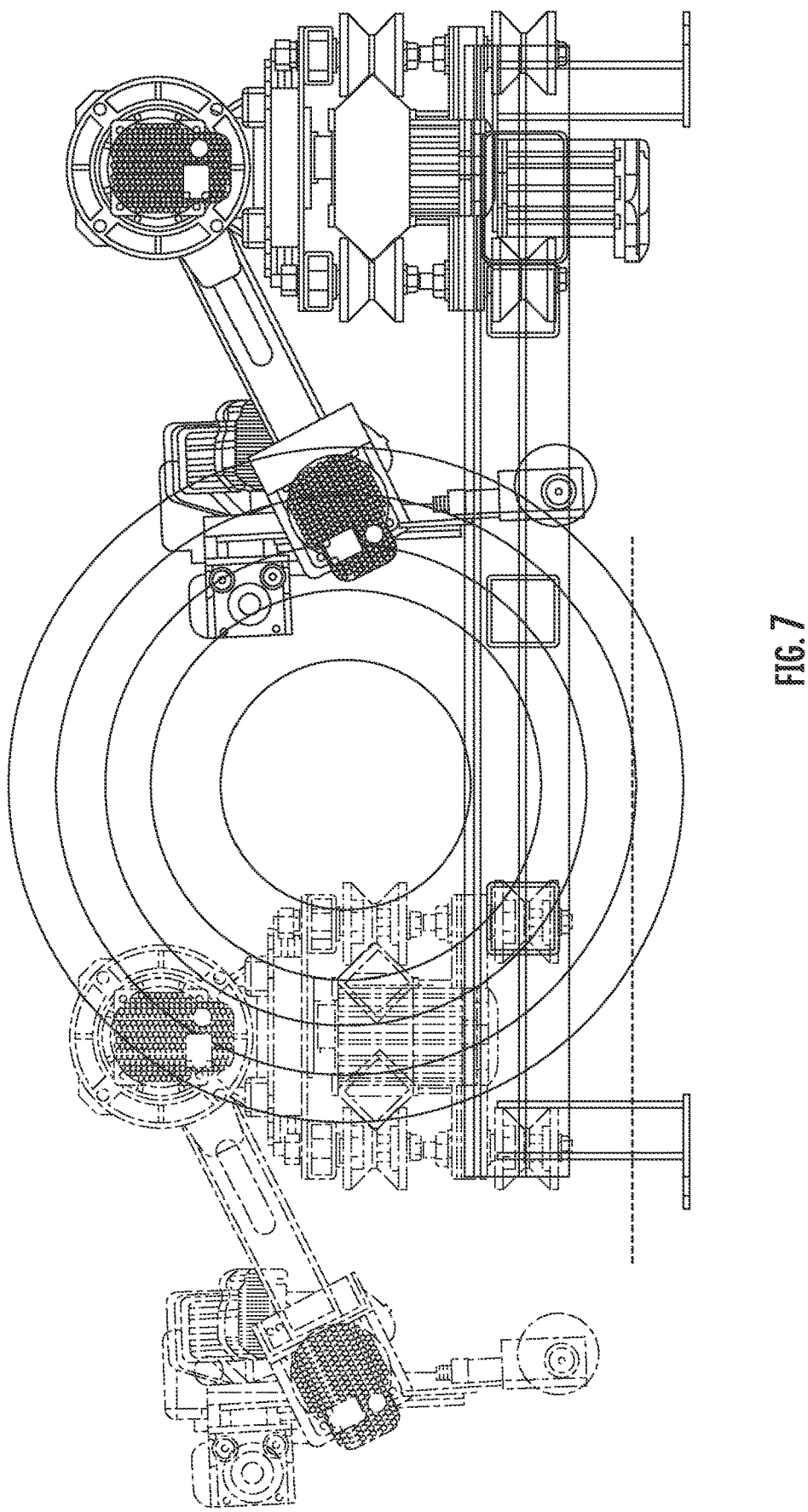
FIG. 7 illustrates step one in which a radar sensor detects tire break and scans to the left.

FIG. 7 illustrates step one in which as soon as a radar sensor detects a tire break, the robot moves to the left and scans the tire diameter. The tire size is stored into computer memory.

Figure 8:
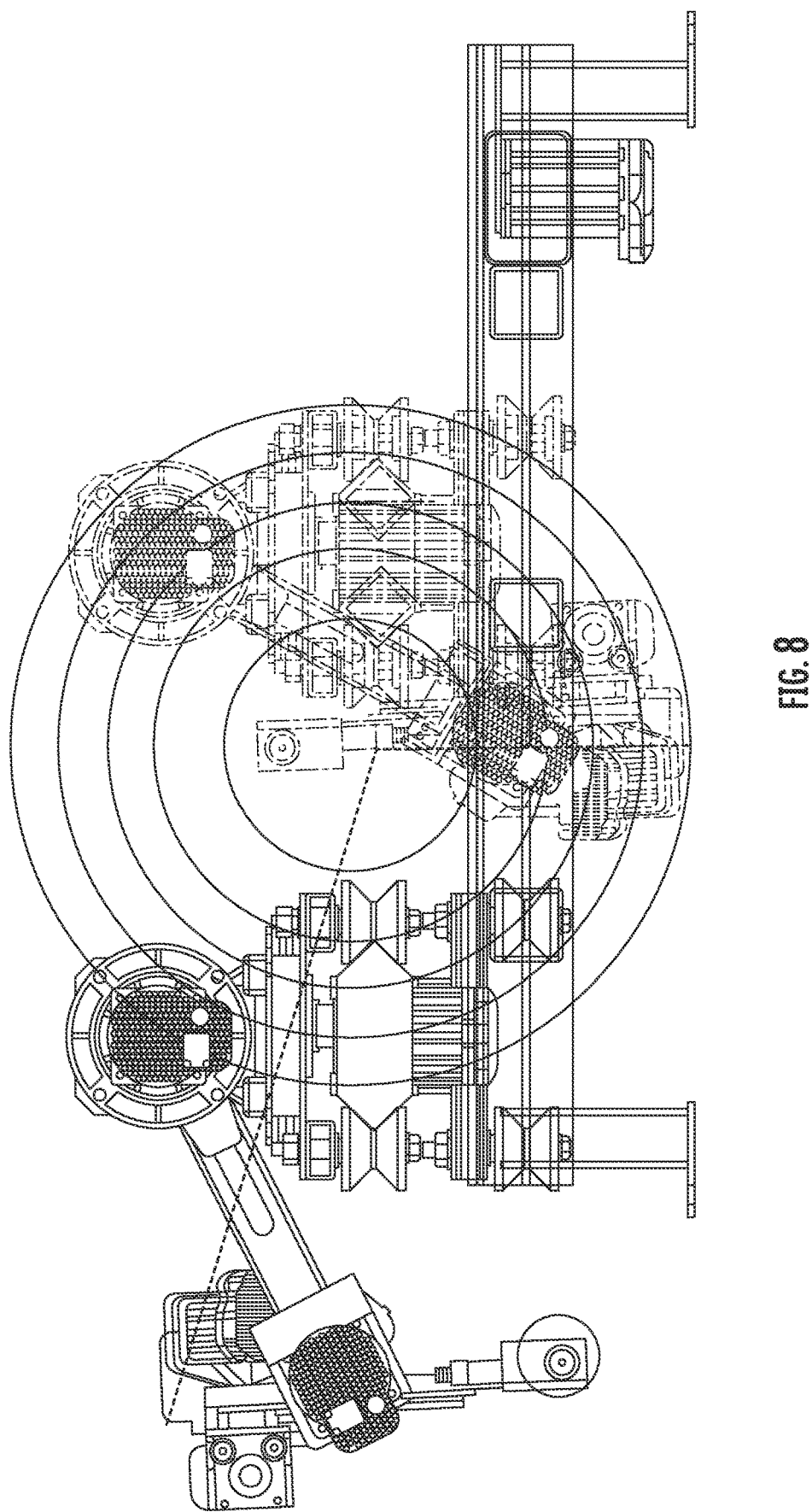
FIG. 8 illustrates step two of measuring tire rim diameter.

FIG. 8 illustrates step two of measuring rim diameter. The robot flips the applicator head 180 degrees, moves to the calculated tire centerline, moves in a distance (such as approximately one half inch away from the wheel) and then drops the inductive proximity switch until it sees the last trailing edge signal.

Figure 9:
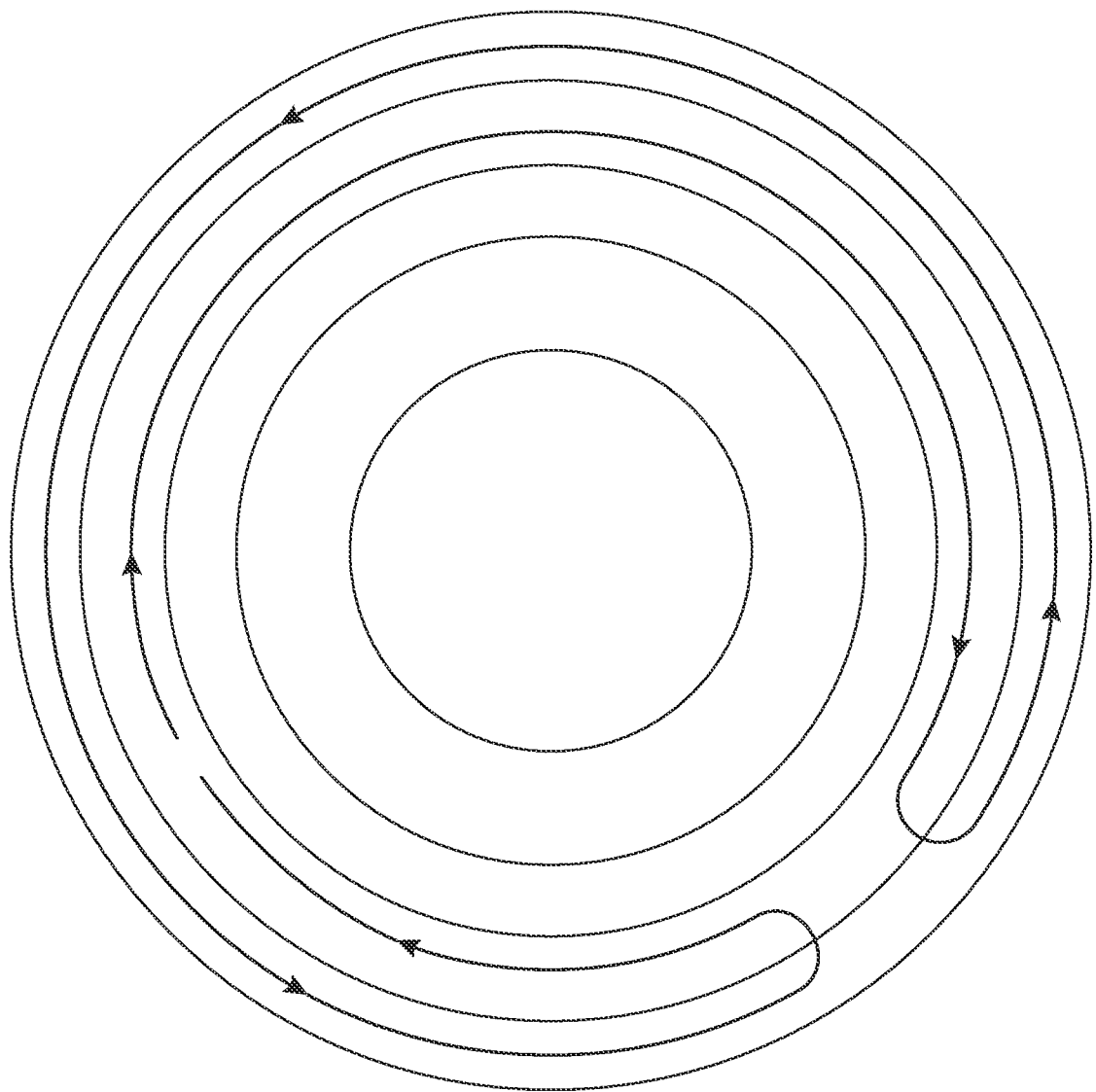
FIG. 9 illustrates a brush path on the vehicle tire.

FIG. 9 illustrates an applicator brush path on the vehicle tire.

Figure 10:
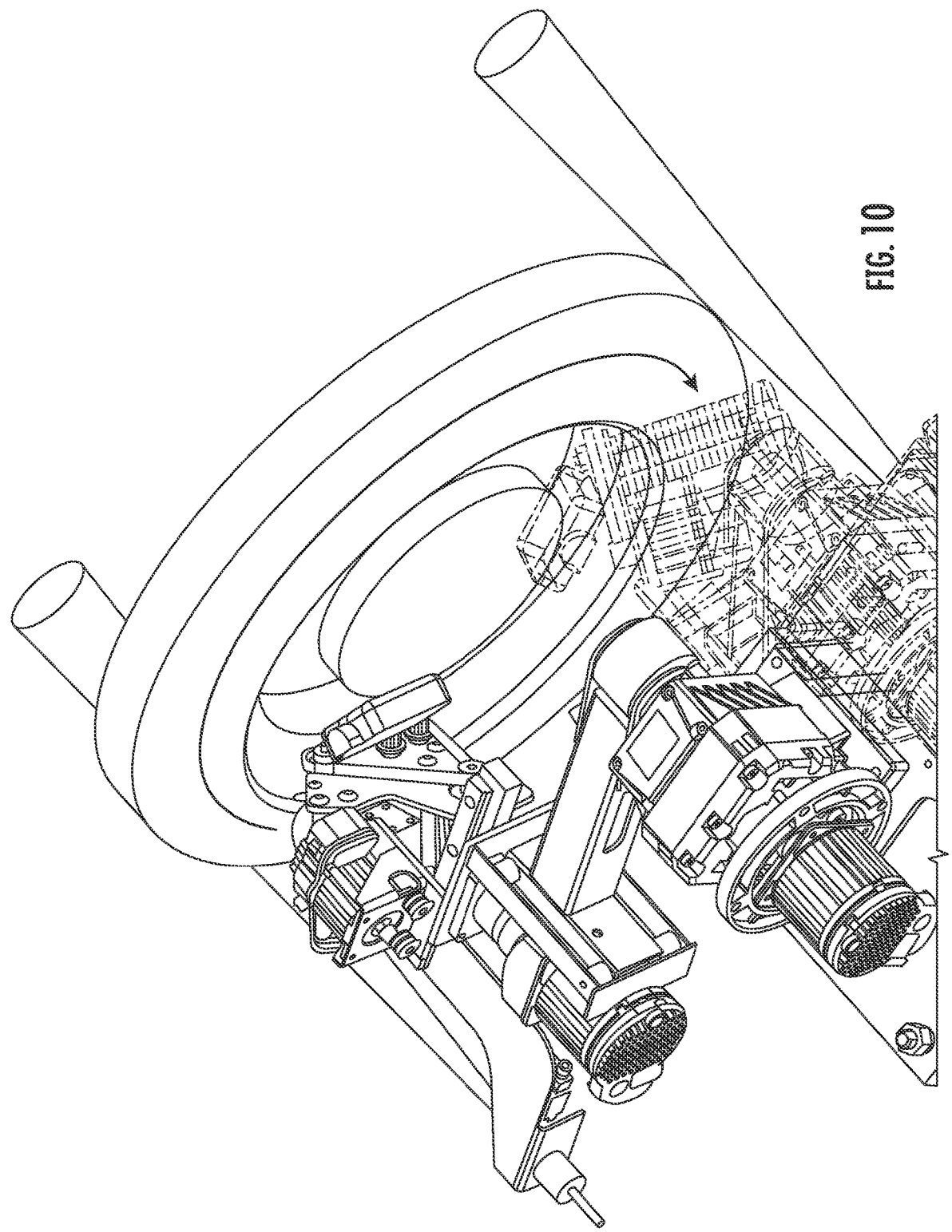
FIG. 10 illustrates step three of sweep and shine inner wall.

FIG. 10 illustrates step three of sweep and shine inner wall.

Figure 11:
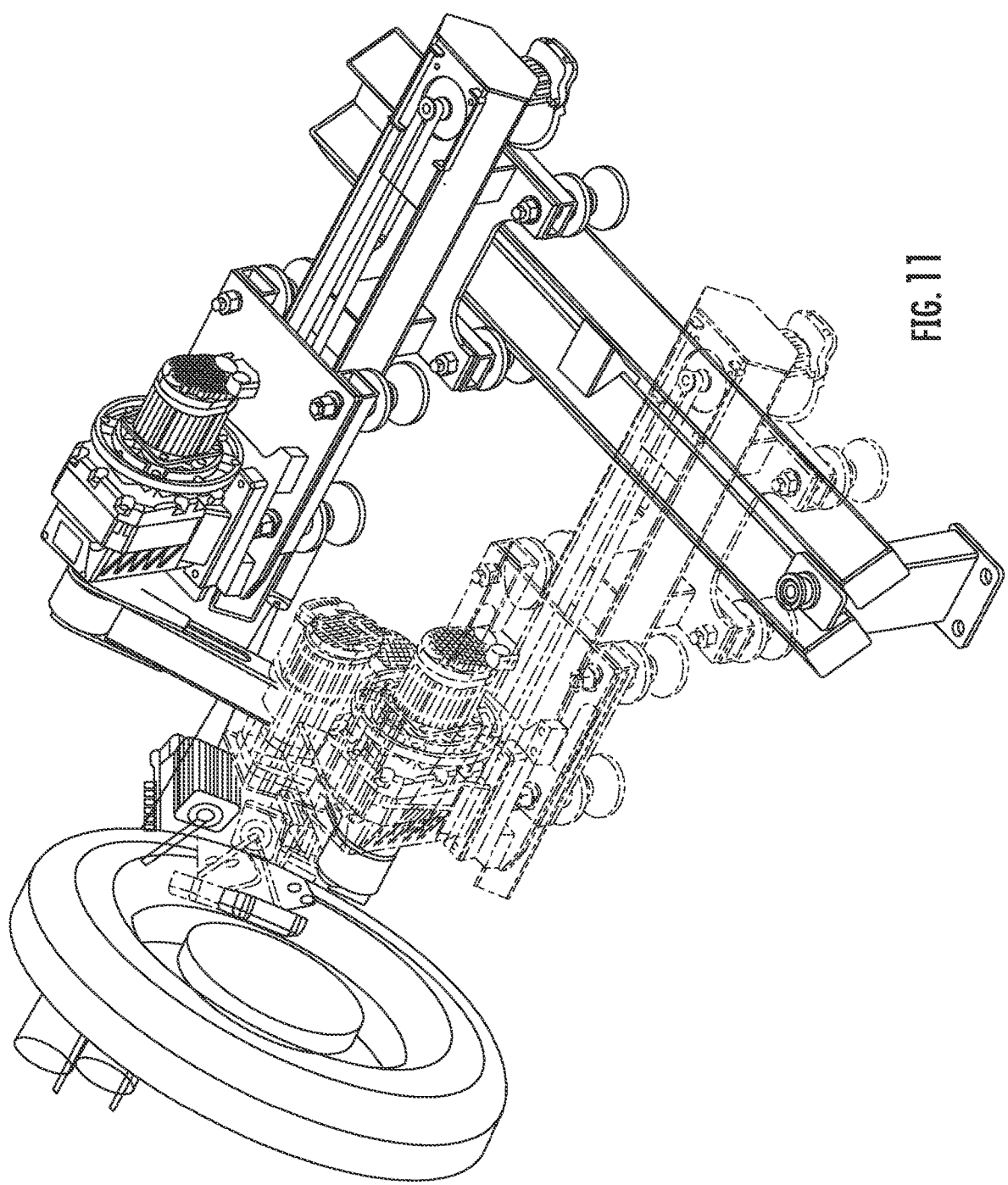
FIG. 11 illustrates step four of shift tire dressing machine (robot) left and swing arm.

FIG. 11 illustrates step four of shift tire dressing machine (robot) left and swing arm. At this point the robot will be out of room on the right side. The applicator head of the robot will back out, swing clockwise from eight o'clock to 4 o'clock position while moving the robot to the left.

Figure 12:
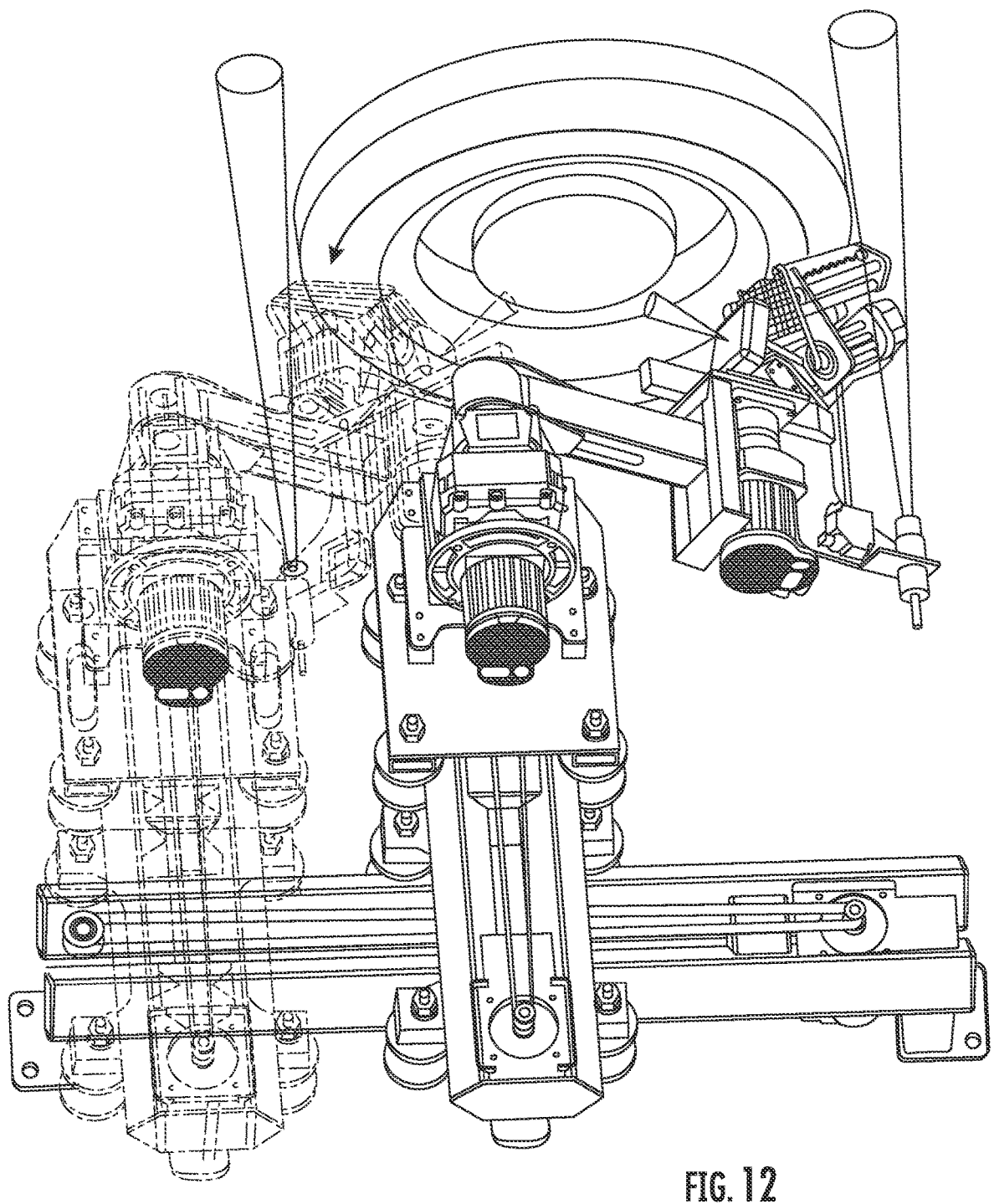
FIG. 12 illustrates step five of shine outer tire diameter.

FIG. 12 illustrates step five of shine outer tire diameter. At the end of the move, the robot will be just following the contour of the vehicle tire as it comes out of the conveyor on the driver side.

Figure 13:
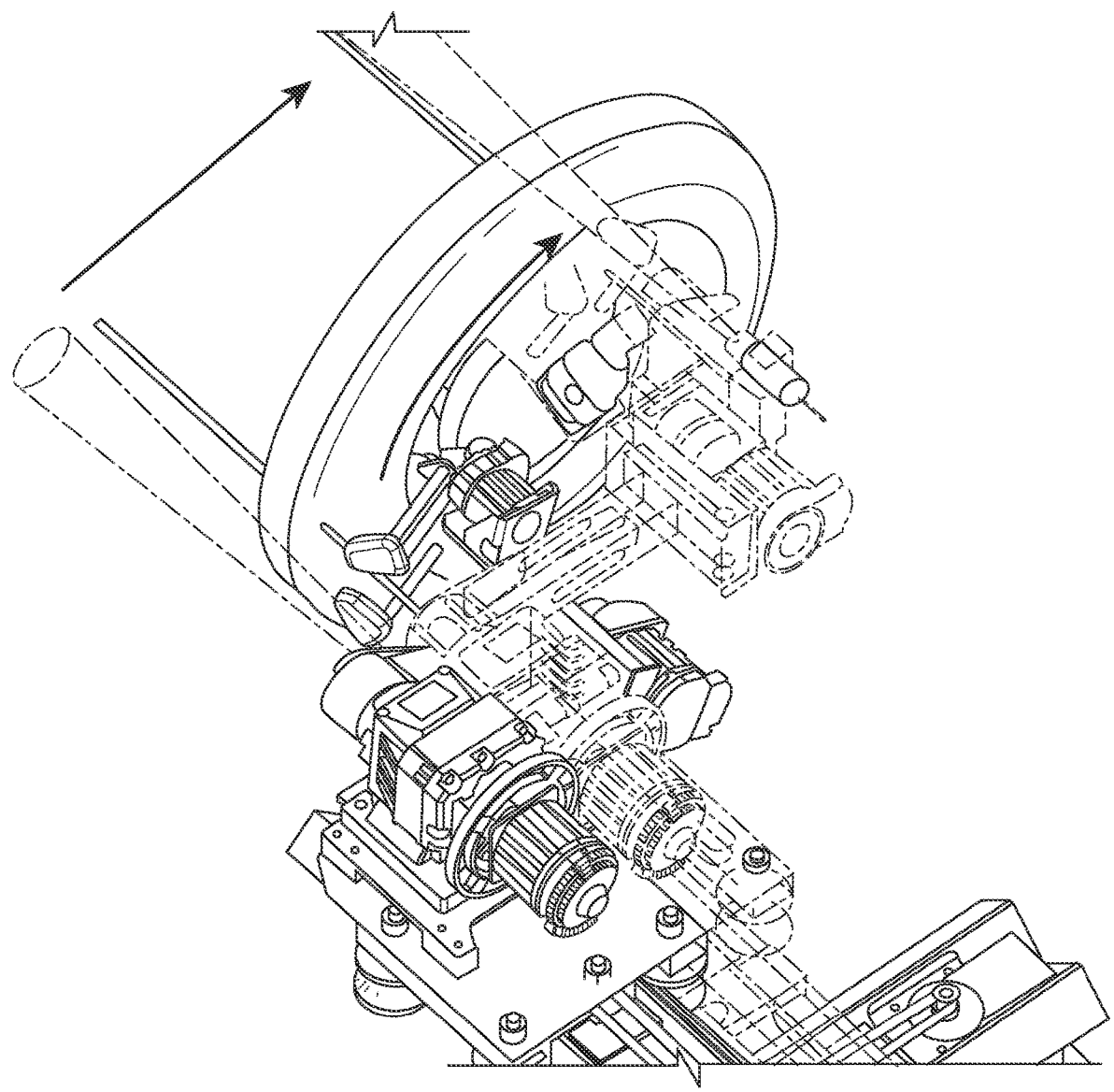
FIG. 13 illustrates step six of finish out last inner tire segment.

FIG. 13 illustrates step six of finish out last inner tire segment. After finish, the robot moves to step one position or the home position.

Figure 14:
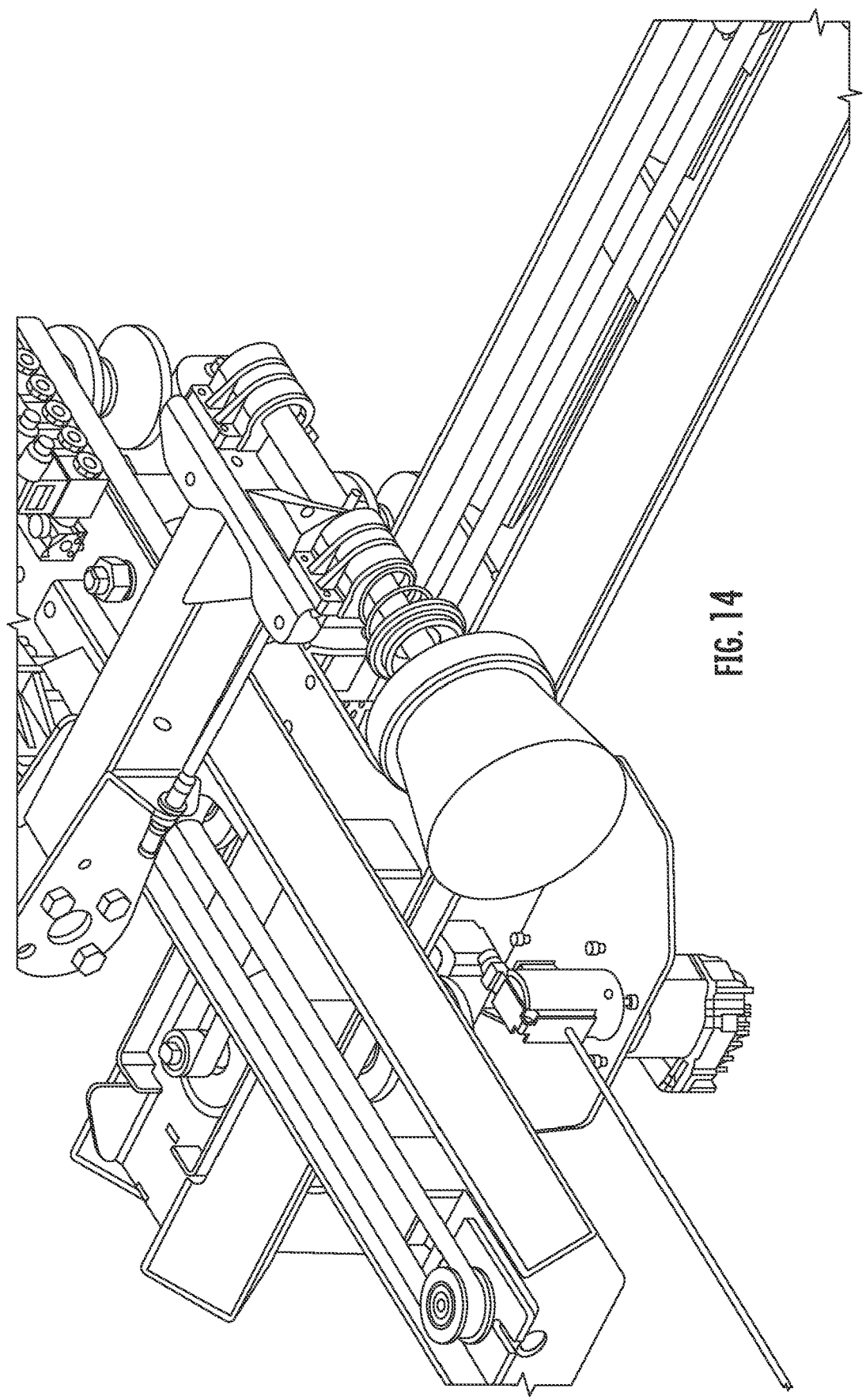
FIG. 14 illustrates a variation of a robot arm effector in accordance with the present invention.

In an embodiment of the invention, the robot arm effector does not require any motors and/or an inductive proximity switch/sensor as shown in FIG. 14.

In an embodiment of the invention, another configuration of a tire dressing machine is provided.

Figure 15:
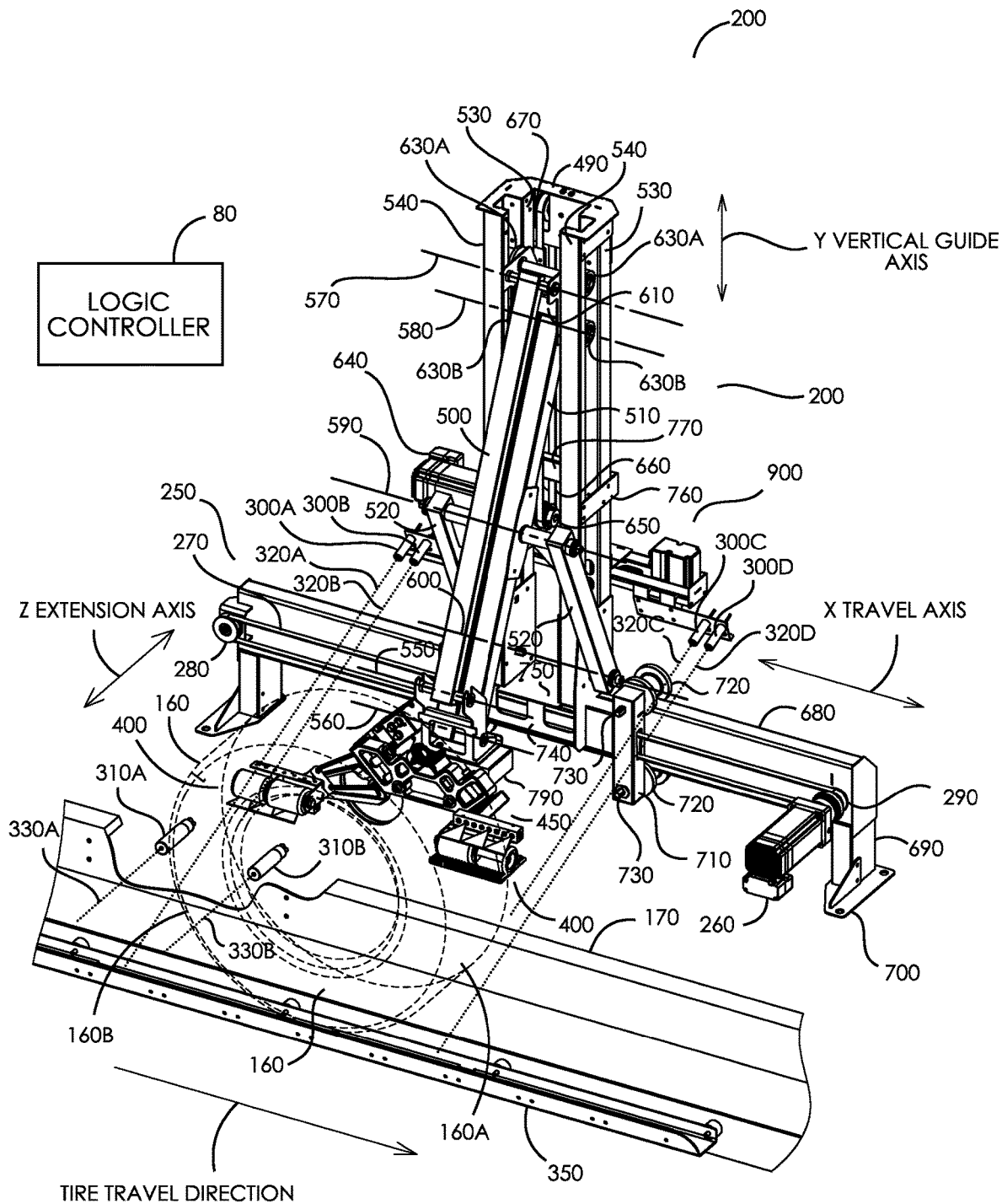
FIG. 15 is an isometric view of a tire dressing machine in an embodiment of the invention next to a transport conveyor such as for use in a carwash tunnel.

FIG. 15 is an isometric view of a tire dressing machine 200 comprising a longitudinal linear guide system and a lateral linear guide system. Tire dressing machine 200 is next to a transport conveyor 170 such as for use in a carwash tunnel. A vehicle tire 160 rolls on transport conveyor 170 in front of the tire dressing machine, preferably moving in a single tire travel direction. Vehicle tire 160 has a tire wall 90 (shown in FIG. 16) with a leading edge 160A and a trailing edge 160B. A logic controller 80 controls motors 260 and 640, preferably servomotors, in their respective axis of motion. Motor 260 shifts the tire dressing machine along a X-travel axis, so as to follow vehicle tire 160 as vehicle tire 160 travels along transport conveyor 170. During the application process, motor 640 actuates an elevator roller assembly 610 downward. Elevator roller assembly 610 has an upper pivot point 570 pivotably connected to an upper linkage 500 and a lower pivot point 580 pivotably connected to a lower linkage 510. Both linkages are approximately the same length and are similarly connected to an effector link assembly 620 (shown in FIG. 17) having upper and lower pivot points 550 and 560. The pivotable connection between assemblies 610 and 620 with linkages 500 and 510 form what is referred to as a four-bar-link, which maintains the vertical orientation of effector link assembly 620 relative to the vertical orientation of elevator roller assembly 610 during operation. In the center of lower linkage 510, pivot point 590 connects one end of control arm 520 and the other end of the control arm is pivotably connected to pivot point 600. Control arm 520 is half the length of linkage 510 and pivot point 600 is the same elevation as pivot point 560. Pivot point 600 is also directly below pivot point 580. Elevator roller assembly 610 is pivotably connected to linkage 510 and control arm 520 in an arrangement referred to as a Scott Russell mechanism, such that when elevator roller assembly 610 is actuated downward, an applicator end expander head assembly 450 is actuated linearly and horizontally toward vehicle tire 160.

Figure 16:
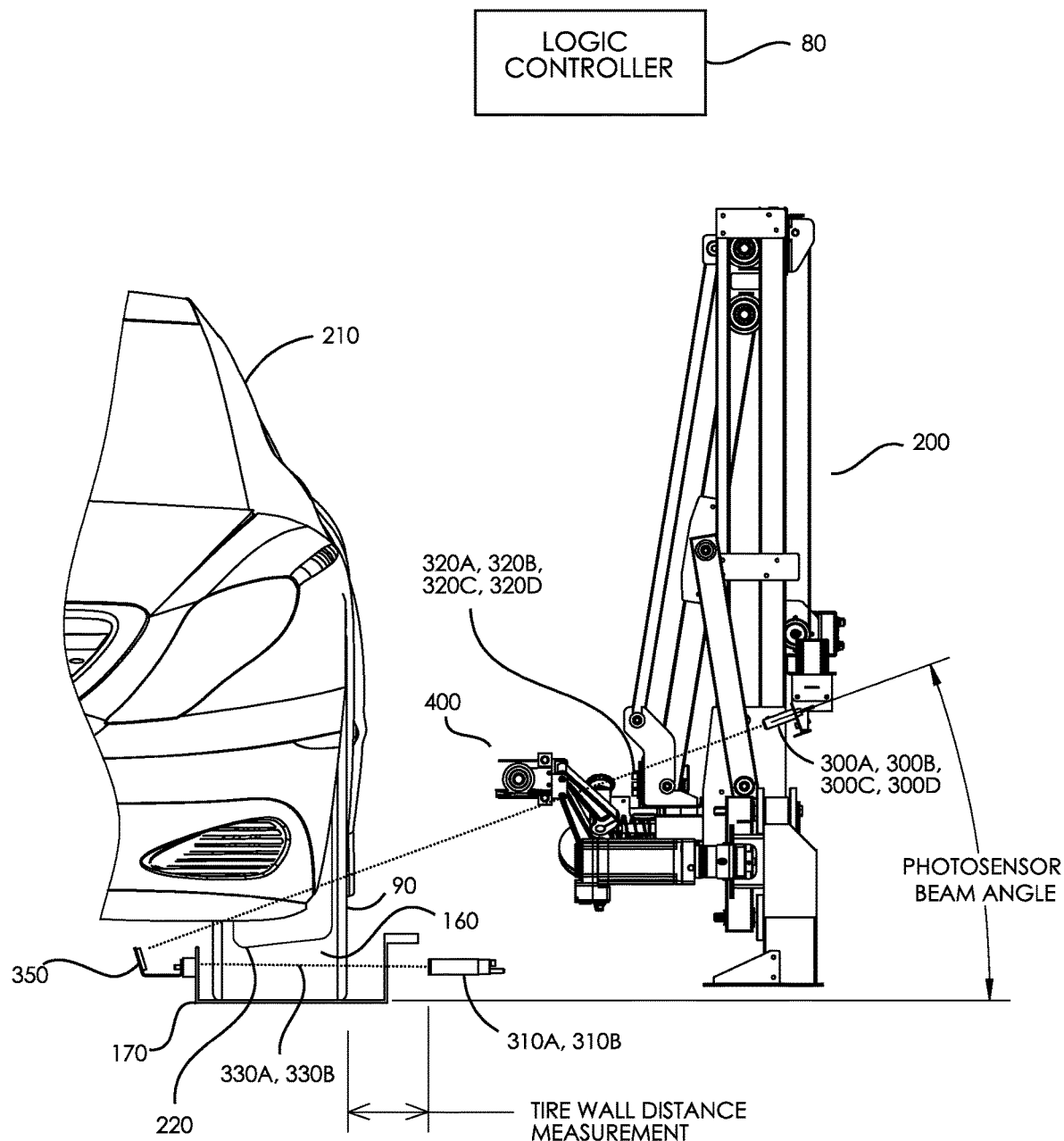
FIG. 16 illustrates the tire dressing machine of FIG. 15 from a front perspective as a vehicle approaches the tire dressing machine and illustrates sensor arrangement and control logic operation.
Figure 17:
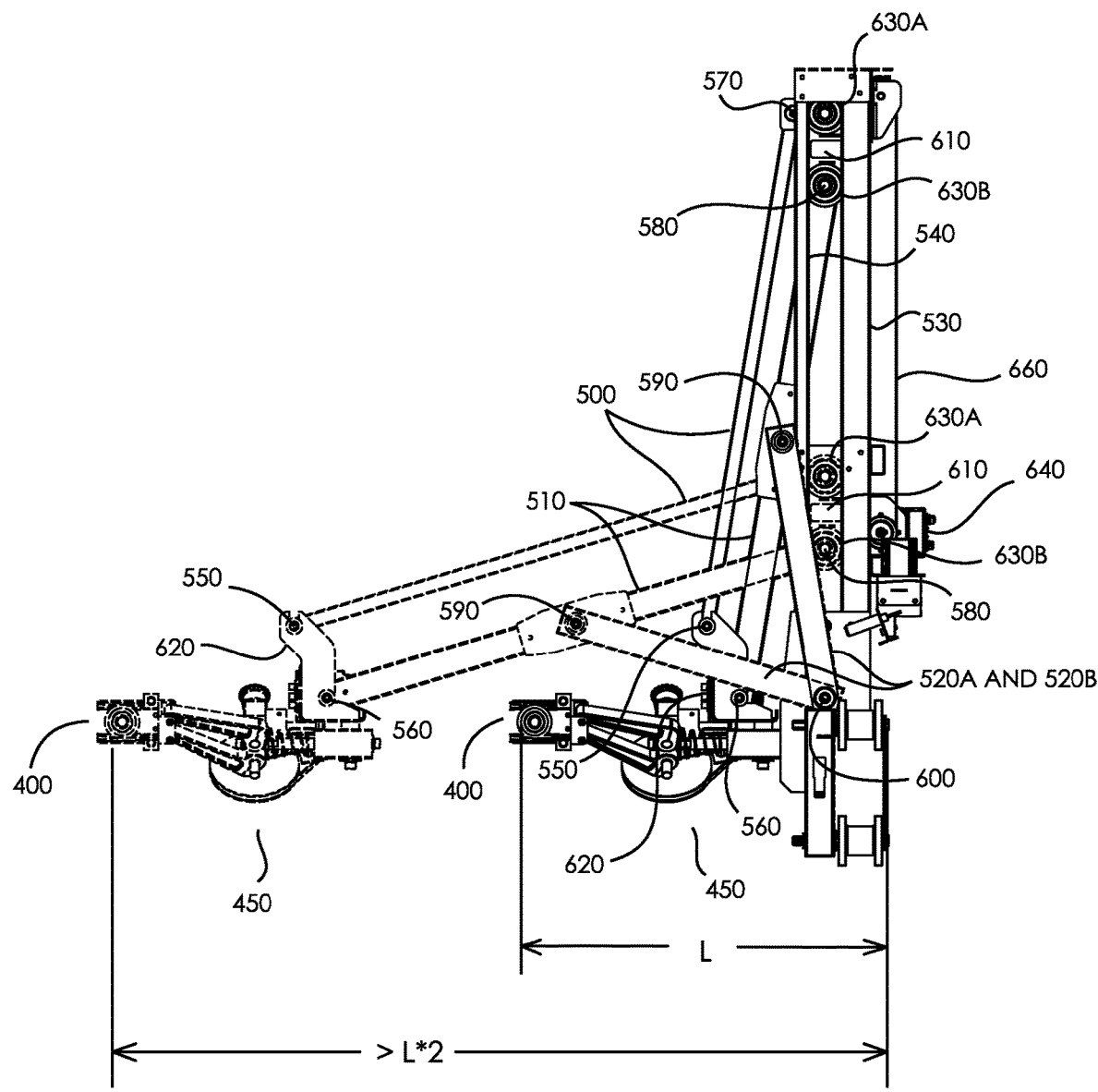
FIG. 17 illustrate the tire dressing machine of FIG. 15 and pivot points allowing the tire dressing machine to articulate.

As shown in FIGS. 16 and 17, it is advantageous that tire dressing machine 200 may occupy a very narrow space laterally while not in operation and at a home position, and yet have a great deal of straight-line lateral horizontal extension. This is shown in FIG. 17 as a home retracted distance of L, and a potential extended distance of greater than L*2. When returning to home position after a cycle, logic controller 80 actuates elevator roller assembly 610 to the top of the tire dressing machine, thereby retracting applicator heads 400 to a home position away from the vehicle tire. Ultrasonic sensors 310A and 310B detect the presence of vehicle tire 160 and the distance of vehicle tire 160 to the sensors as vehicle tire 160 rolls into a tire dressing machine area or station, and ultrasonic sensors 310A and 310B send analog signals to logic controller 80. For many vehicles, there is a gap between the fenderwell and/or ground effects and the vehicle tire. Logic controller 80 detects such a gap when photosensor eyes 300C and 300D respectively have a clear detection of a reflector 350. This is translated as an "ON" condition for each respective sensor. Subsequently, as the vehicle tire progresses, photosensor eye 300C will become blocked by the vehicle tire which is translated as an "OFF" condition, and photosensor eye 300D will remain "ON" as photosensor eye 300D detects reflector 350. Logic controller 80 moves tire dressing machine 200 along the X-travel axis at a velocity so as to follow leading edge 160A of vehicle tire 160 by monitoring with photosensor eyes and by adjusting the velocity of the tire dressing machine accordingly. As soon as leading edge 160A is detected, logic controller 80 causes a photoeye array adjustment unit (not shown) to contact a trailing set of photosensor eyes 300A and 300B closer to the leading edge photosensor eyes 300C and 300D until photosensor eye 300A is "ON", photosensor eye 300B is "OFF", interpreted as vehicle tire trailing edge detection. At this point in the operation, the tire dressing machine is locked onto the velocity and approximate tire diameter. Correspondingly, logic controller 80 causes expander head assembly 450 to adjust position of applicator heads 400 to the size of the tire diameter of vehicle tire 160. By actuation and kinematics, expander head assembly 450 is pushed towards vehicle tire 160 and applicator heads 400 apply a tire dressing chemical to tire wall 90.

Figure 18A:
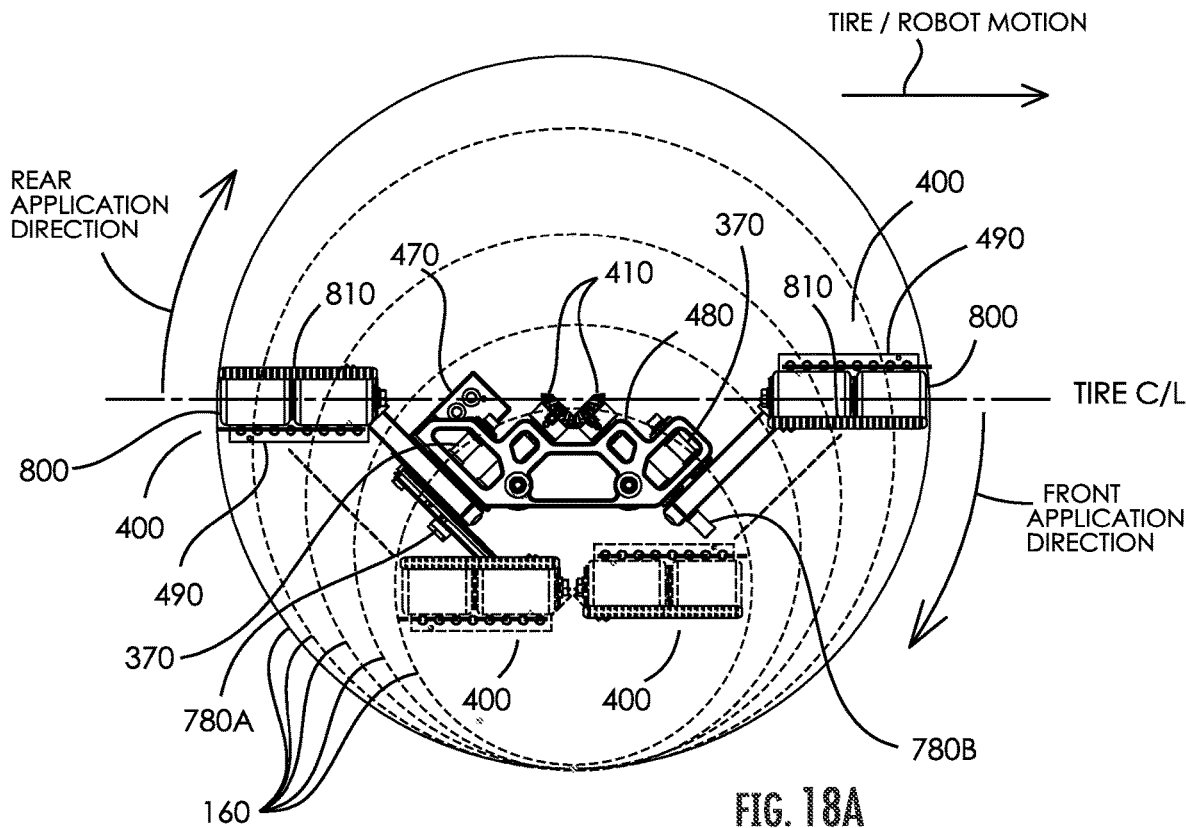
FIGS. 18A and 18B illustrate how an effector head of the tire dressing machine of FIG. 15 expands and contracts to accommodate and process vehicle tires of varying diameters.
Figure 18B:
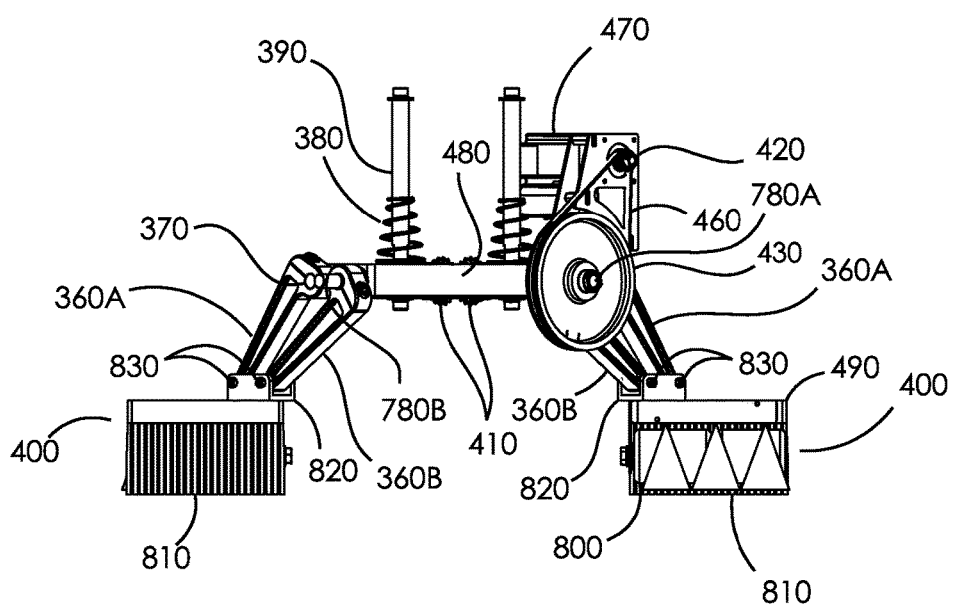

FIGS. 18A and 18B illustrate how expander head assembly 450 of FIG. 17 expands and contracts to accommodate and process vehicle tires of varying diameters. Logic controller 80 controls a motor 470, preferably a servomotor, having a first timing pulley 420 attached and thereby driving a timing belt 460. A second timing pulley 430 is used to give the motor drive adequate gear reduction. Second timing pulley 430 is constrained rotationally to drive a shaft 780A. Drive shaft 780A intermeshes with an intermediate drive shaft 780B at a 90 degree angle to each other and housed in a housing 480 and are drivenly connected by bevel gears 410. Both drive shafts have respective expander arms 360A and 360B mounted thereon and are timed in a general mirror image to each other in their actuation with expander head assembly 450 on each end. This allows the tire dressing machine to drive applicator heads 400A and 400B at 45 degrees from horizontal and vertical centerplanes of the vehicle tire. This configuration of the tire dressing machine is positioned such that motor 470 operates in a selected direction, the applicator heads 400 will either expand and raise, or contract and lower, to match the horizontal centerline and diameter of vehicle tires of varying dimensions. As the tire moves and rotates through the tire dressing station, the applicator pads/rollers of applicator heads 400 will maintain positions at the leading edge tire position 160A and trailing edge tire position 160B at the horizontal centerline while applying a dressing chemical to tire wall 90. With the applicator heads located opposite each other, vehicle tire 160 can be processed in 180 degrees of motion. One applicator head provides for an upper side coverage, the other applicator head provides for a lower side coverage.

Tire dressing machine 200 also utilizes a four-bar-link kinematic arrangement in conjunction with each applicator pad/roller 800 so as expander arms 360A and 360B are actuated, the applicator heads maintain an orientation that is normal to the tire wall allowing pads/rollers 800, spray manifold 490, and wipers 810 to maintain a preferred angle of approach. Located in housing 480 additionally, are two more rotationally driven shafts 370. One shaft is parallel to drive shaft 780A and another shaft is parallel to drive shaft 780B. At a lower end of each of drive shafts 370 are expander arms 360A and 360B rotational keyed to the drive shafts and pivotably secured into clevis links 820. The expander arms 360A and 360B are also pivotably connected to the each end of clevis links 820 having clevis pins 830 and which together act as four-bar links to actuate the applicator heads.

Expander head assembly 450 is designed to somewhat float on the end of tire dressing machine 200 so as to keep impacts during operation to a minimum. Therefore, expander housing 480 is connected to tire dressing machine 200 by support shafts 390 located into a bearing block 790 allowing for linear movement by expander head assembly 450. Coil springs 380 maintain a compliant bias force between tire dressing machine 200 and expander head assembly 450 so when tire dressing machine 200 pushes expander head assembly 450 against the vehicle tire then expander head assembly 450 can float accordingly. It should be noted that those familiar with robotics and general machinery would recognize that even though not all explicitly shown herein, suitable bearings and bushings would be used where required throughout the design.

FIG. 16 shows tire dressing machine 200 from a front perspective as a vehicle 210 approaches tire dressing machine 200 and illustrates sensor arrangement and control logic operation. Sensors 300A, 300B, 300C and 300D are mounted in parallel at a generally 20 degree angle to the floor, and emit respective photobeams 320A, 320B, 320C and 320D toward reflector 350. Reflector 350 is mounted inside of vehicle transport conveyor 170 and low enough to not damage or be damaged by the bottom of vehicle 210. The photobeams are located to detect any open area between potential ground effects 220 and vehicle tire 160 and detect at least a portion of vehicle tire 160 high enough to give a rough diameter of the vehicle tire. The tire diameter is calculated from multiple points, preferably 3 points, on a circle, and the circle translating to the vehicle tire. One point is the bottom of the vehicle tire where the vehicle tire touches the ground. Two other points are at the leading edge 160A and trailing edge 160B of the vehicle tire, whereby a circle chord is measured between these two points. Since the photobeams are at an angle, and the tire wall will be a different distance from the tire dressing machine. The vehicle tire distance is measured by ultrasonic analog sensors 310A and 310B. Using a distance measurement, logic controller 80 calculates the height at which the leading edge photobeams at the leading edge and photobeams at the trailing edge are broken to give the position of the chord point measurement and a tire diameter for processing.

Figure 19:
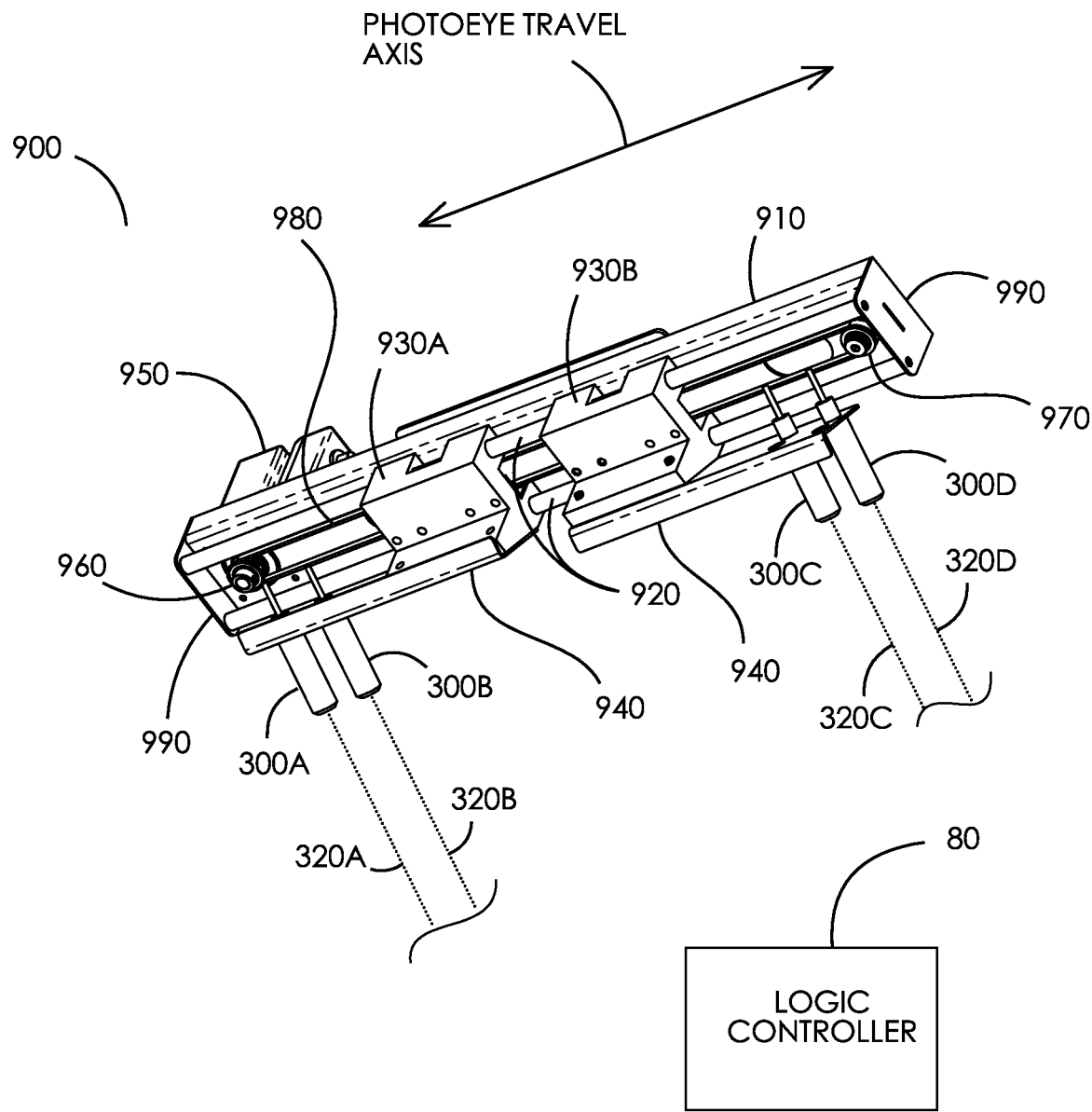
FIG. 19 is a detailed isometric view of an eye sizing assembly of the tire dressing machine of FIG. 15.

FIG. 19 is a detailed isometric view of eye sizing assembly 900. A channel chassis 910 has termination caps 990 at its distal ends to receive linear guide shafts 920 arranged in parallel to each other and to the chassis. Linear bearing blocks 930A and 930B have precision clearance holes therein and are able to receive the linear guide shafts. Motor 950 controlled by logic controller 80 is secured into an end of the chassis and has timing drive pulley 960 mounted onto the chassis. At opposite ends of the chassis, a timing idler pulley 970 is suitably mounted into the chassis with rotationally free movement. A timing belt 980 spans across the chassis and wraps around timing drive pulley 960 and timing idler pulley 970. One side of timing belt 980 connects to one of bearing blocks 930A or 930B, and the other side of the timing belt connects to the other of bearing blocks 930A or 930B so when motor 950 rotates clockwise it causes bearing blocks 930A and 930B to move inward toward each other and when it rotates counter-clockwise it causes bearing blocks 930A and 930B to move away from each other. One of the bearing blocks has leading edge photoeyes 300C and 300D mounted to the bearing block by bracket 940, and the other bearing block 930 has trailing edge photoeyes 300A and 300B mounted to the bearing block by a bracket 940. In this way, logic controller 80 causes the leading set of eyes and the trailing set of eyes to expand and contract according to the size of the vehicle tire being measured. Termination caps 990 close out the chassis and secure linear guide shafts 920.

Referring back to FIG. 15 and FIG. 17, these figures illustrate tire dressing machine and pivot points allowing the tire dressing machine to articulate accordingly. Tire dressing machine 200 sits upon and is guided by a longitudinal linear (X-travel axis) guide system/frame assembly 250. An elongated metal tubing 680 lies parallel to vehicle transport conveyor 170 and has vertical risers 690 welded to each of its distal ends thereby elevating tire dressing machine 200 off the wash bay floor. Each vertical riser 690 has a termination plate 700 welded to a lower end which allows the tire dressing machine to be anchored into the wash bay floor. At one end of tubing 680, a motor 260, preferably a servomotor, is mounted to the X-travel axis frame assembly 250 by a mounting bracket (not shown). Motor 260 having a timing drive pulley 290 secured to motor 260 and at the opposite end of the tubing a timing idler pulley 280 is mounted to the frame assembly 250 by a bracket and bearings (not shown) for free rotational movement. A timing belt 270 is wrapped around pulleys 290 and 280 spans along the length of the tubing.

Tire dressing machine 200 is connected to timing belt 270 which allows motor 260 to actuate the tire dressing machine along the X-travel axis. The tire dressing machine 200 has a vertical framework that is comprised of spaced apart elongated linear tubings 530 and 540 that are arranged in parallel and welded to an upper termination cap 490 and a lower termination plate 750. Structural reinforcements 760 and 770 may be welded onto the vertical framework. This framework is welded to a base tubing 740 having vertical tubings 710 at each end. Vertical tubings 710 accept travel idler shafts 730 which in turn, accept idler wheels 720. Idler wheels 720 are located top and bottom of X-frame tubing 680 and tightly guide the tired dressing machine for linear reciprocal motion thereupon. Approximately in the middle of the tire dressing machine, motor 640 is mounted on an end of tire dressing machine 200 with timing pulley 650 secured onto the end. On the upper end of tire dressing machine 200, idler timing pulley 670 is located with timing belt 660 wrapped around timing pulley 670. Timing belt 660 is driven by timing pulley 650.

A Scott Russell mechanism is formed by bar links 510 and 520, and a sliding elevator mechanism 610. Elevator mechanism 610 is a weldment having an upper set of guide rollers 630A and a lower set of guide rollers 630B which are controlled and guided within vertical tubings 530 and 540 of tire dressing machine 200. Elevator mechanism 610 has an integral pivot point 580 connecting main extension bar link 510 on one end. Main extension bar link 510 is pivotably connected to extension head link 620 on the other end and has pivot point 590 at the center of the main extension bar link. Rotational control short links 520A and 520B are pivotably connected at a center point and are also pivotably connected to the tire dressing machine at pivot 600. Elevator mechanism 610 is connected to elevator timing belt 660 such that when motor 640 rotates, elevator mechanism 610 raises or lowers and articulates the Scott Russell mechanism and expander head assembly 450 extends or retracts in a straight line accordingly.

Additionally, the four-bar-link mechanism formed by joining links 610, 500, 510 and 620 with pivot points 550, 560, 570 and 580 in conjunction with the Scott Russell mechanism causes expander head assembly 450 to remain in parallel.

Figure 20:
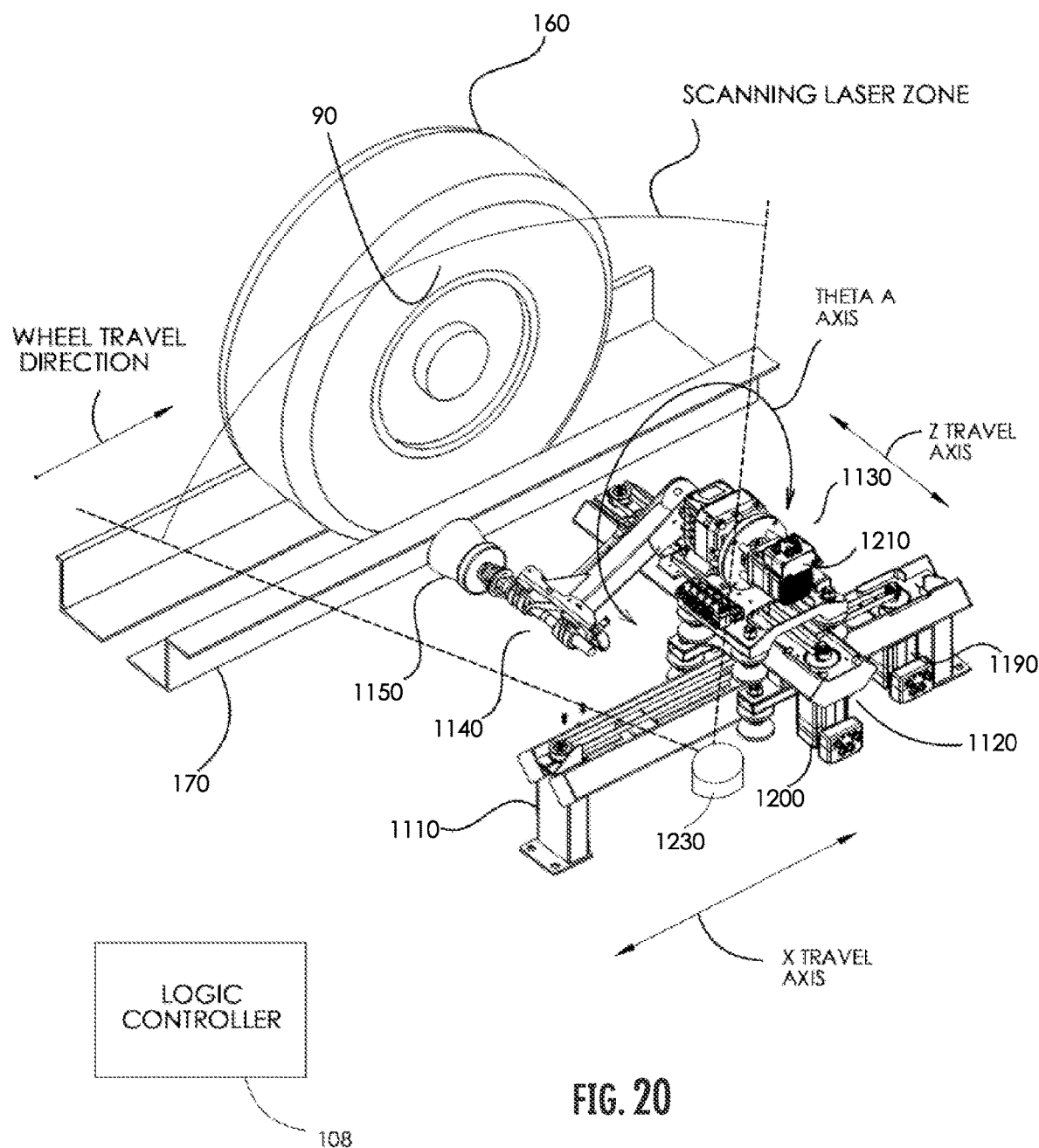
FIG. 20 is an isometric view of the tire dressing machine of FIG. 15 as installed in a carwash tunnel next to the transport conveyor.

FIG. 20 is an isometric view of the tire dressing machine 200 as installed in a carwash tunnel next to transport conveyor 170. Vehicle tire 160 having tire wall 90 and a metal tire rim 240 (shown in FIG. 21) moves in front of tire dressing machine 200 in a single direction. Logic controller 108 controls motors 1190, 1200, and 1210 in their respective motion axis. Motor 1190 shifts tire dressing machine 200 along the X-travel axis, so as to follow the vehicle tire as the vehicle tire travels along transport conveyor 170. Motor 1200 extends the tire dressing machine into the vehicle tire by linearly actuating a shuttle 1130 until the application head is in position and retracts shuttle 1130 to a home position away from the vehicle when not in use. Motor 1210 rotates the tire dressing arm assembly 1140 about Theta A axis to raise and lower the applicator head (shown as 1150 in FIG. 20) according to the tire diameter and tire height.

A rotational laser scanning sensor 1230 sweeps a profile of the vehicle tire continuously as the vehicle tire travels down transport conveyor 170, and measures size of the vehicle tire by scanning across a tire chord. Logic controller 80 calculates the tire diameter. Rotational laser scanning sensor 1230 can track the progress of the vehicle tire in transport conveyor 170. It should be noted that logic controller 80 is programmed such that it can maintain a linear-circular relationship between the X-travel axis and Theta A axis to maintain coordinated motion that causes the applicator head to follow the contour of the tire wall during the tire dressing application.

Figure 21:
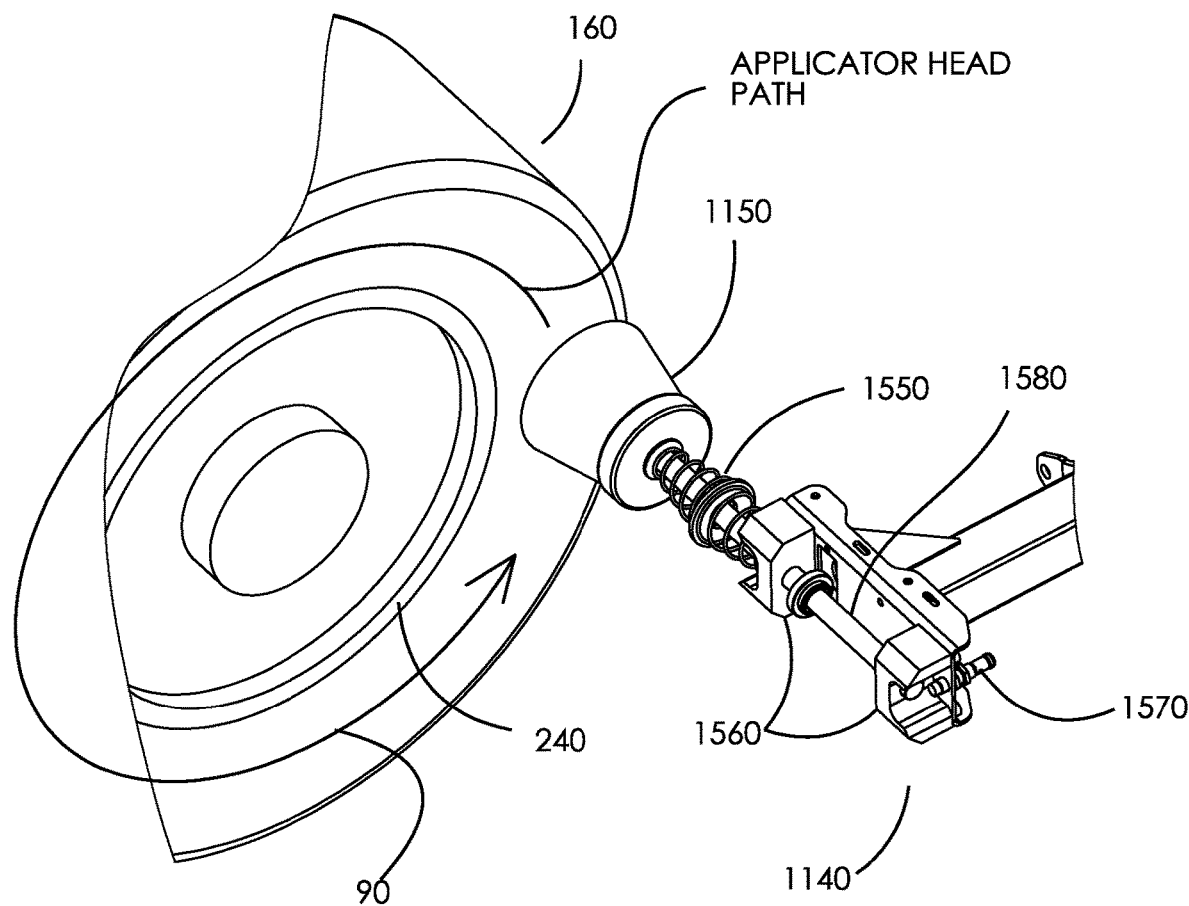
FIG. 21 is a cropped isometric view illustrating an applicator head path on a vehicle tire.
Figure 22:
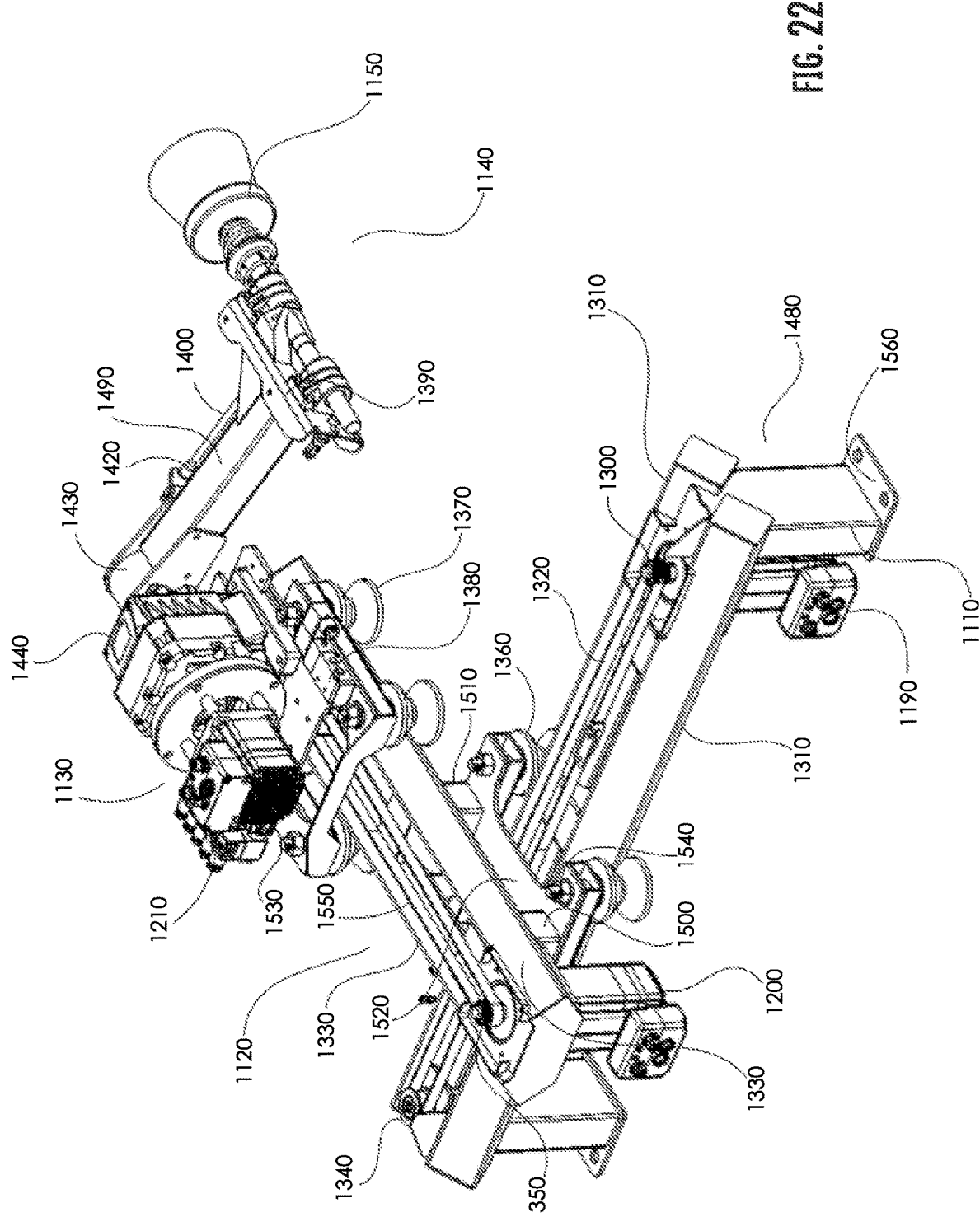
FIG. 22 is a detailed isometric view of the mechanicals of the tire dressing machine of FIG. 15.

FIG. 21 is a cropped isometric view illustrating a path of the applicator head. FIG. 22 is a detailed isometric view of the mechanicals of the tire dressing machine. A longitudinal X-travel axis frame/weldment 1480 has elongated square tubings 1310 that serve as structural and guide elements for the tire dressing machine and are supported at distal ends by vertical end posts 1110 that elevate the track and provide clearance for the X-travel axis motor 1190. The bottom ends of the vertical end posts have flange plates 1560 welded on to anchor the tire dressing machine to the floor. A lateral linear (Z-travel axis) frame/weldment 1120 is mounted transverse and upon the X-travel axis frame by V-rollers 1360A, 1360B, 1360C, and 1360D that tightly guide the Z-travel axis frame on the X-travel axis base frame tubings. The Z-travel axis frame is reciprocally driven back and forth by motor 1190 mounted into the X-travel axis frame, a drive pulley 1300 secured onto motor drive shaft 1200, and a timing belt 1320 driven by the drive pulley and wrapped around idler pulley 1340 at the opposite end of the X-travel axis frame assembly 250. When the applicator head impacts the tire, support shaft 1580 (shown in FIG. 21) slides through flange plates 1560 and is pushed in front of a proximity switch. The proximity switch sends a signal to logic controller.

The Z-travel axis frame 1120 is a weldment having elongated square tubings 1330 which are supported and spaced apart by tubing standoffs 1500 and 1510. Tubing standoffs 1500 and 1510 are terminated at bottom ends by Z-travel axis frame base plate 1520. Idler axles 1540A, 1540B, 1540C, and 1540D are bolted through and concentrically secure V rollers 1360.

Shuttle assembly 1130 has a baseplate 1380 with clearance holes in the baseplate whereby a gearbox 1440 is bolted to a top face of the baseplate, a gearbox output shaft 1430 extending outward toward the vehicle and adapted for mounting a robotic arm 1140 for rotational actuation of the robotic arm. The gearbox input is driven by a motor 1210 having a coupler or spline type of connection. This assembly is actuated for linear reciprocal movement toward and away from the vehicle by motor 1200 mounted into the Z-travel axis chassis at one end of the chassis and motor 1200 having timing pulley 1350 secured onto the end of the motor for driving timing belt 1550. At the other end of timing belt 1550 an idler pulley (not shown) is mounted into the Z-travel axis chassis supports the other end of timing belt 1550 for rotational movement. Additionally, downward extending idler shafts 1530A, 1530B, 1530C, and 1530D are secured into the baseplate, securing V-rollers 1370 so as to locate the shuttle assembly 1130 onto the Z-travel axis chassis for linear reciprocal motion thereupon.

Robotic arm 1140 is an elongated square tube 1490 with flanges at the rotational driving end to house a machined shaft coupling 1430 which locks the robotic arm 1140 onto the end of drive gearbox. At the robotic arm distal end, several isolation mounts 1390 allow the connection of head rotation stage 1460 with the applicator head at the end without a rigid mechanical connection. This allows for potential vehicle impacts or cycle failures without damaging the tire dressing machine. The isolation mounts when elastic give in all force applied directions and an indicator rod 1400 along with a proximity sensor 1420 separate when this occurs and send a signal to logic controller 80, thereby detecting an impact.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A system comprising:
   a sensor mounted adjacent to a transport conveyor for a vehicle having a vehicle tire, wherein the sensor is operably connected to at least one motor and is movable across a chord of the vehicle tire,
   a logic controller in communication with the sensor, wherein the logic controller calculates a measurement of the vehicle tire, and
   a vehicle tire dressing machine in communication with the logic controller, wherein the vehicle tire dressing machine has a timing pulley for driving a timing belt.

2. The system according to claim 1, wherein the sensor is mounted in a pathway of the vehicle to detect the presence of the vehicle tire.

3. The system according to claim 1, wherein the logic controller in communication with the sensor is operable to calculate a diameter of the vehicle tire from the chord.

4. The system according to claim 1, wherein the sensor is a metal detecting sensor.

5. The system according to claim 4, wherein a tire rim is detectable by the metal detecting sensor.

6. The system according to claim 1, wherein the sensor is in communication with the logic controller in a form of a signal.

7. The system according to claim 1, wherein the vehicle tire dressing machine comprises an applicator head operable to circumferentially sweep the vehicle tire.

8. The system according to claim 7, wherein the applicator head is in an orientation normal to a tire wall of the vehicle tire.

* * * * *